US008787266B2

(12) United States Patent
Matischek et al.

(10) Patent No.: US 8,787,266 B2
(45) Date of Patent: Jul. 22, 2014

(54) MEDIUM ACCESS CONTROL IN INDUSTRIAL AND AUTOMOTIVE WIRELESS WITH COMBINED WIRED AND WIRELESS SENSOR NETWORKS

(75) Inventors: Rainer Matischek, Graz (AT); Markus Dielacher, Graz (AT); Martin Flatscher, Graz (AT); Josef Prainsack, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1718 days.

(21) Appl. No.: 12/139,073

(22) Filed: Jun. 13, 2008

(65) Prior Publication Data

US 2009/0310571 A1 Dec. 17, 2009

(51) Int. Cl.
*H04W 4/00* (2009.01)

(52) U.S. Cl.
USPC .......................................... 370/329

(58) Field of Classification Search
USPC .......................................... 370/329
See application file for complete search history.

(56) References Cited

U.S. PATENT DOCUMENTS

| 7,079,831 | B2 | 7/2006 | Schwartzman et al. | |
|---|---|---|---|---|
| 7,324,804 | B2* | 1/2008 | Hrastar et al. | 455/410 |
| 7,830,838 | B2* | 11/2010 | Kohvakka et al. | 370/330 |
| 8,041,772 | B2* | 10/2011 | Amanuddin et al. | 709/208 |
| 2003/0133426 | A1* | 7/2003 | Schein et al. | 370/337 |
| 2005/0007974 | A1* | 1/2005 | Vasudevan et al. | 370/320 |
| 2006/0114940 | A1* | 6/2006 | Cho et al. | 370/498 |
| 2006/0268908 | A1* | 11/2006 | Wang et al. | 370/401 |
| 2007/0050240 | A1* | 3/2007 | Belani et al. | 705/13 |
| 2008/0253327 | A1* | 10/2008 | Kohvakka et al. | 370/330 |
| 2008/0259895 | A1* | 10/2008 | Habetha et al. | 370/345 |
| 2008/0279155 | A1* | 11/2008 | Pratt et al. | 370/336 |
| 2009/0088605 | A1* | 4/2009 | Ross et al. | 600/300 |
| 2010/0290405 | A1* | 11/2010 | Arnott et al. | 370/329 |
| 2011/0038343 | A1* | 2/2011 | Bhatti et al. | 370/330 |

FOREIGN PATENT DOCUMENTS

WO   WO 2007113523 A1 * 10/2007 ............. H04L 12/28

OTHER PUBLICATIONS

IEEE Std. 02.15.4-2006; Wireless Medium Access Control (MAC) and Physical Layer (PHY) Specifications for Low-Rate Wireless Personal Area Network (WPAN); IEEE, Sep. 7, 2006, 1-65 pages.*
Rhee, Injong, "Z-MAC: A Hybrid MAC for Wireless Sensor Networks", IEEE/ACM Transactions on Networking, vol. 16, No. 3, Jun. 2008, pp. 511-524.*
Szewczyk, R., et al.; "Lessons from a Sensor Network Expedition"; University of Ca., Berkley, CA; pp. 1-16.

(Continued)

*Primary Examiner* — Guang Li
(74) *Attorney, Agent, or Firm* — Slater & Matsil, L.L.P.

(57) ABSTRACT

An embodiment of the invention relates to a local area sensor network including a central unit configured to receive a resource allocation request from a priority network sensor in a reserved timeslot and in response to designate a shared timeslot allocation. The priority network sensor transmits a resource allocation request in a reserved timeslot, and the sensor transmits data in the allocated shared timeslot. A sensor network can be formed with multiple gateways that each communicate over wired and wireless portions of the network. The central unit communicates with the gateways over the wired portion of the network. Wireless nodes communicate wirelessly with the gateways. The central unit receives a plurality of link quality indicators from the gateways for respective wireless paths to the wireless sensors, and selects a gateway for relaying a message from the central unit to a wireless sensor based on the link quality indicators.

24 Claims, 14 Drawing Sheets

(56) References Cited

OTHER PUBLICATIONS

Culler, D., et al.; "Overview of Sensor Networks"; IEEE 2004; Aug. 2004; pp. 41-49.

Glaser, S., "Some Real World Applications of Wireless Sensor Nodes"; SPIE Symposium on Smart Structures & Materials/NDE 2004, San Diego, California, Mar. 14-18, 2004; 12 pages.

IEEE Std. 802.15.4™-2003; Part 15.4: Wireless Medium Access Control (MAC) and Physical Layer (PHY). Specifications for Low-Rate Wireless Personal Area Networks (LR-WPANs); Oct. 1, 2003; 679 pages.

IEEE Std 802.15.4™-2003; IEEE Standard for Local and Metropolitan Area Networks; IEEE 2003; pp. 140-164.

ZIGBEE Specification; Document 053474r13; Dec. 1, 2006; ZigBee Standards Organization 2006; 534 pages.

El-Hoiydi, A., Spatial TDMA and CSMA with Preamble Sampling for Low Power Ad Hoc Wireless Sensor Networks; Proceedings of the Seventh International Symposium on Computers and Communications (ISCC'02); IEEE 2002; 8 pages.

Rajendran, V., et al., "Energy-Efficient, Application-Aware Medium Access for Sensor Networks"; IEEE 2005; MASS 2005; 8 pages.

Rajendran, V., et al., "Energy-Efficient, Collision-Free Medium Access Control for Wireless Sensor Networks"; Kluwer Academic Publisher 2004; Netherlands; pp. 1-34.

Afonso, J.A., et al., "Design and Implementation of a Real-Time Wireless Sensor Network"; 2007 International Conference on Sensor Technologies and Applications; IEEE 2007; pp. 496-501.

Flammini, A., et al.; "A Real-Time Wireless Sensor Network for Temperature Monitoring"; IEEE 2007; pp. 1916-1920.

Demirkol, I., et al.; "MAC Protocols for Wireless Sensor Networks: A Survey"; IEEE Communications Magazine, Apr. 2006; pp. 115-121.

Karn, P., "MACA[1]—A New Channel Access Method for Packet Radio"; 5 pages.

Xu, K., et al., "How Effective is the IEEE 802.11 RTS/CTS Handshake in Ad Hoc Networks?"; University of California, Los Angeles, Computer Science Department; Los Angeles, California; 7 pages.

IEEE Std. 802.15.4-2006; Wireless Medium Access Control (MAC) and Physical Layer (PHY) Specifications for Low-Rate Wireless Personal Area Network (WPAN); IEEE, Sep. 7, 2006, 65 pages.

Rajendran et al., "Energy-Efficient, Collision-Free Medium Access Control for Wireless Sensor Networks," Wireless Networks, vol. 12, Issue 1, Feb. 2006, pp. 63-78.

"IEEE Standard for Information Technology—Telecommunications and Information Exchange Between Systems—Local and Metropolitan Area Networks—Specifications Requirements; Part 15.4: Wireless Medium Access Control (MAC) and Physical Layer (PHY) Specifications for Low-Rate Wireless Personal Area Networks (WPANs)," IEEE Computer Society, IEEE Std 802.15.4-2006 (Revision of IEEE Std 802.15.4-2003), Sep. 8, 2006, 323 pages.

Rhee et al., "Z-MAC: A Hybrid MAC for Wireless Sensor Networks," IEEE/ACM Transactions on Networking, vol. 16, No. 3, Jun. 2008, pp. 511-524.

\* cited by examiner

MEDIUM ACCESS CONTROL IN INDUSTRIAL AND AUTOMOTIVE WIRELESS WITH COMBINED WIRED AND WIRELESS SENSOR NETWORKS

TECHNICAL FIELD

An embodiment of the invention relates generally to wireless sensor and actuator networks and methods, and more particularly to providing medium access control and combining wired and wireless communication arrangements for enhanced communication reliability.

BACKGROUND

A modern car may include hundreds of electronic sensors and actuators such as driver compartment temperature sensors and seat belt alarms that are polled and controlled by one or more central units (CUs). In common polling and control arrangements, the sensors and actuators are connected via hundreds of cables that are bundled in cable harnesses with a combined length that can reach 1-4 km. The growing cost and expanding utilization of copper produced by such arrangements presents an important design issue for the ongoing development of automotive vehicles as well as for industrial manufacturing systems. The expanding use of electronically controlled end devices now tests the practical limits of any practical wired interconnection arrangement.

A "fieldbus" wiring system targeted for industrial environments was developed in the late 1980s to share data connections in hard-wired sensor networks to reduce the number of copper interconnections. A fieldbus system is generally used with a wired local area network of sensors and actuators, and follows one of a variety of standards for real-time distributed control. Fieldbus approaches were originally developed to replace the RS-232 serial interface that requires a terminating communication element at each end of a twisted wire pair that might carry 4 to 20 mA of dc current. The RS-232 serial interface does not easily accommodate daisy chain- or ring-type communication structures, and accordingly requires a substantial amount of wiring to implement a complex or widely dispersed network.

An advantage of a wired network such as a fieldbus wiring system is its robustness against external interferences, particularly if shielded cables are used, which leads to very low bit error rates (BERs). However, communication reliability depends on the physical integrity of the cables which make a fieldbus arrangement prone to mechanical interruptions.

Two major disadvantages of wired networks, especially for automotive applications, are limited flexibility of mounting and deploying sensor devices because of the necessary cable routing. In addition, increased weight and costs are added to a vehicle by the extensive number and length of cabling and interconnections generally required to couple sensor units with a central unit.

The use of wireless communication techniques in applications that span automotive and industrial systems, office automation, security and alarm systems, and environmental monitoring and surveillance would introduce new design flexibilities as well as replace a substantial amount of copper cabling. Even a partial replacement of cables with wireless data transmission would be an advantageous enhancement to a fieldbus approach.

The performance of wireless sensor networks is often limited by contention for time or frequency slots by a large number of simultaneously communicating sensors. The quantity of data that can be transmitted by an individual sensor ranges from a single bit, such as a bit associated with a contact closure, to a larger file, such as a download of a sensor history file. There is also a wide range of acceptable latencies for data communication. For example, a sensed temperature in an interior compartment of an automobile can be easily deferred for a number of seconds, whereas sensing the motion of an adjustable mirror in an automobile is a time-critical event that can be readily detected by a human operator if it is delayed. Consequently, contention by multiple sensor nodes for common-use timeslots has been an ongoing problem in wireless sensor networks.

A further disadvantage of the use of a WSN (wireless sensor network) in a harsh industrial or automotive environment is its susceptibility to radio noise and interference, which increases the bit error rate. When using a conventional WSN architecture, there are two opposing design options with necessary tradeoffs. One is to use a conventional star topology (as illustrated, for example, in FIG. 1) which carries less traffic, resulting in fewer radio collisions and shorter delays. However, redundant transmission paths are not provided, which results in a higher BER if the network nodes are separated by any substantial distance. Another design option is to use a conventional wireless ad hoc multi-hop network topology such as a cluster-tree or mesh topology. This produces shorter hop-to-hop transmission paths, which leads to less hop-to-hop bit errors. However, more network traffic results due to message forwarding, which leads to a higher probability of radio collisions and longer communication delays. It also makes ad hoc routing less predictable, which is less suitable for industrial or automotive applications.

A conventional networking solution to overcome these limitations in a plain star topology WSN is to dynamically increase the transmission power of the nodes that lie on the physical periphery of the network. But this results in two drawbacks. One is that some of the wireless sensor nodes require more energy, and a second is that the higher transmission power increases the radio interference range among the nodes.

Another solution to overcome these limitations is to structure the network with wired-to-wireless gateways. Although some conventional hybrid networks use wired-to-wireless gateways, they simply use fixed gateways that each communicates with a fixed subnet of wireless nodes, resulting in a rigid structure formed with several independent star networks. Thus, the gateways are not coordinated with a protocol that could be employed to improve the dependability of the wireless links.

With the exception of tire pressure monitoring and keyless entry systems, integrated WSNs have not been deployed in cars today, particularly systems employing coordinated resources to avoid message collisions. Future automotive applications are anticipated to be configured with a star topology wireless network, which is generally the better implementation structure for small and resource-limited wireless end devices (nodes). A star topology typically ensures shorter and more predictable message delays. But a disadvantage of a conventional wireless star architecture for such applications is the inhomogeneity of network link quality. Messages transmitted from wireless sensor nodes that are distant from the central unit (CU) or are shielded by reflecting or attenuating materials exhibit a higher BER due to the weaker received signal.

There has also been substantial research in recent years on the medium access control ("MAC") properties of pure wireless sensor networks intended for autonomous operation in systems deployed over a large physical area. Since wireless communication arrangements are generally susceptible to radio noise and various interference mechanisms, such networks must be properly conditioned to enable their use in uncontrolled industrial and automotive environments. For these and other applications, a combination of wired and wireless communication is a needed alternative.

Past research on medium access control for wireless sensor networks has been primarily aimed at reducing signaling overhead and reducing idle listening time. Most of these projects have been focused on self-organization features and on energy efficiency because previous wireless sensor networks have been optimized for these application issues and requirements.

An example of a typical wireless sensor network application is low data-rate monitoring of a large physical area over an expanded extended period of time using a self-organizing, wireless, multi-hop network. Such networks have been described by A. Mainwaring, et al., in the technical report entitled "Lessons From A Sensor Network Expedition," University of California, Berkeley and Intel Research Laboratory at Berkeley, 2003, by M. Srivastava, et al., in the technical report entitled "Overview of Sensor Networks, University of California, Berkeley and University of California Los Angeles, August 2004, and by Glaser, S. D., et al., in the paper entitled "Some Real-World Applications of Wireless Sensor Nodes," Proceedings of the SPIE Symposium on Smart Structures and Materials, NDE 2004, San Diego, Calif., Mar. 14-18, 2004, which documents are hereby referenced and incorporated herein.

In contrast to the networks studied in these research efforts, networks applied in emerging industrial or automotive applications cannot rely on such typical ad hoc wireless communication paths. In automobiles of recent design, many non-safety-critical comfort sensors such as air conditioning sensors and actuators, seat adjustment devices, or tire pressure sensors have been candidates for monitoring with a low data rate wireless sensor network. In previous designs, these sensors and actuators were interconnected with hard wiring, or were not included in the vehicle design.

To ensure adequate response time and data reliability for the more important system elements in a low data-rate network, the local wireless network should be centrally controllable and should ensure deterministic timing (e.g., latency and throughput), at least for high priority sensors and actuators that can be readily identified. Without such assurance, automotive manufacturers will continue to deploy wired sensor networks to meet customer performance expectations.

Thus, there is a need for a new medium access control arrangement for a wireless sensor network that can provide reliable communication for critical network elements and that can ensure a maximum timing latency in view of the network data rate. This need would be satisfied with a communication system that combines wired and wireless communication paths that provide reliable data transfer in a harsh environment.

SUMMARY OF THE INVENTION

In accordance with an exemplary embodiment, a wireless sensor network and a related method are provided. In an embodiment, a sensor network includes a central unit configured to receive a resource allocation request in a reserved timeslot from a priority network sensor. The central unit transmits a reservation bit map including an allocation of an otherwise shared timeslot in response to the resource allocation request. The priority network sensor unit is configured to transmit the resource allocation request in a reserved timeslot in a guaranteed reservation period. In response to receiving the resource allocation in the reservation bit map, the priority network sensor unit transmits data in the allocated shared timeslot. In an embodiment, the local area network further includes a non-priority network sensor unit, the non-priority network sensor unit configured to receive the reservation bit map, and in response to finding an unallocated shared timeslot therein, to transmit data in the unallocated shared timeslot.

In accordance with a further exemplary embodiment, a sensor network includes a plurality of gateways configured to communicate over wired and wireless portions of a network, and a wireless node configured to communicate with a gateway of the plurality of gateways. The sensor network further includes a central unit configured to communicate with the plurality of gateways over a wired portion of the network, the central unit configured to receive a plurality of link quality indicators from the plurality of gateways for respective wireless paths from the wireless node to the plurality of gateways. The central unit is further configured to select a gateway of the plurality of gateways for relaying a message from the central unit to the wireless node. In an embodiment, the central unit is configured to select the gateway of the plurality of gateways for relaying the message based on the plurality of link quality indicators.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a wireless sensor network configured to coordinate medium access for periodic, aperiodic, and event-driven periodic messages to provide contention-free access for selected network nodes. A wireless network in an exemplary embodiment includes a combination of wired and wireless gateways to provide an adaptable hybrid virtual star communication arrangement for network nodes.

An embodiment of the invention may be applied to various wireless sensor network arrangements, for example, to a wireless sensor network in an automotive environment to provide contention-free access for selected sensor nodes. Other wireless sensor network arrangements can be constructed using a medium access control protocol as introduced herein in different contexts using inventive concepts described herein, for example, a wireless sensor network applied in an industrial/manufacturing environment.

Figure 1:
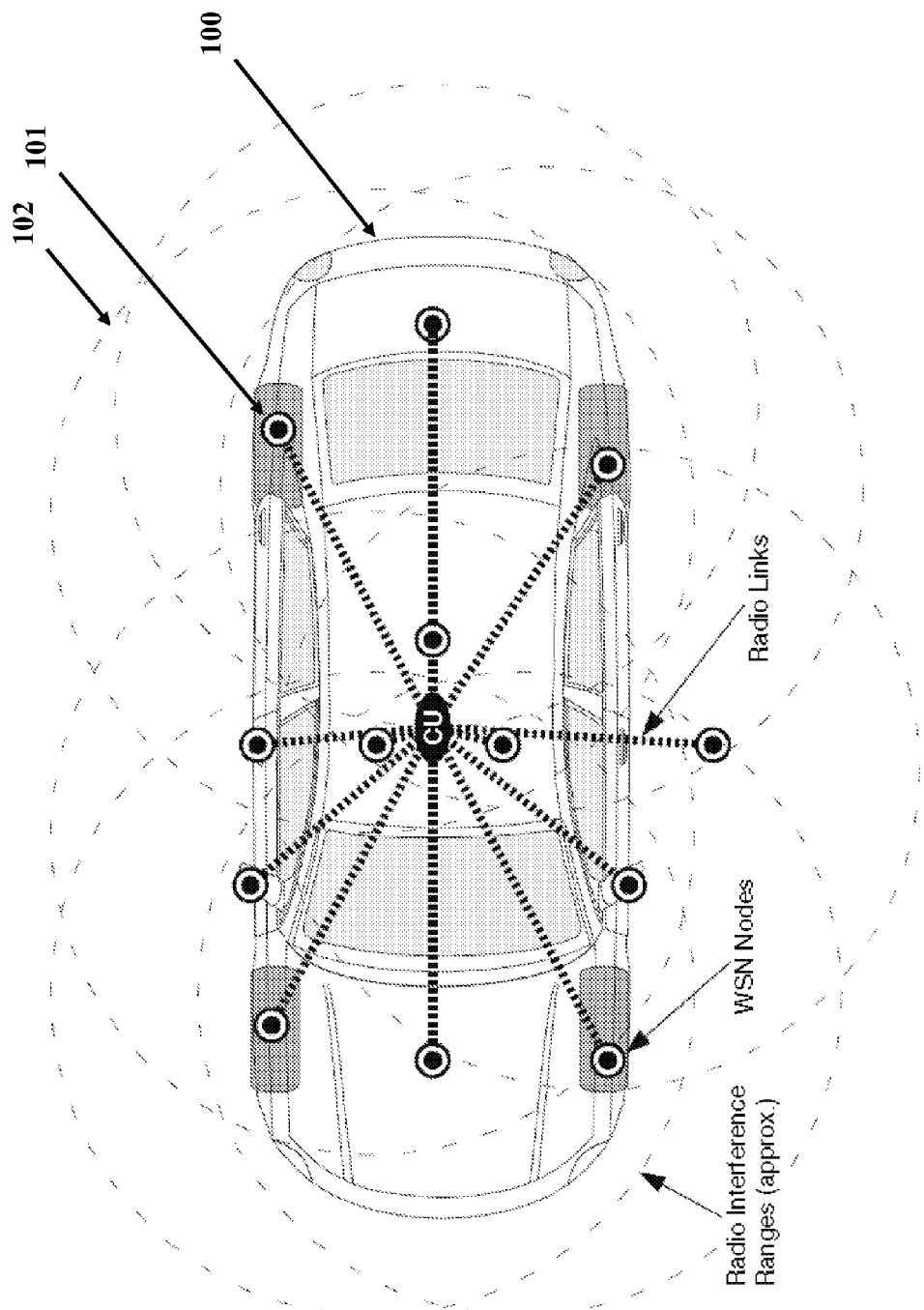
FIG. 1 illustrates a radio coverage/interference map of an exemplary automotive wireless sensor network configured in a star network topology.

Turning now to FIG. 1, illustrated is an exemplary automotive local area network configured as a wireless sensor network system. The figure illustrates the outline of a vehicle 100 and a tire pressure sensor node 101. The network is configured in a star network topology wherein sensor nodes communicate directly with a central unit, and illustrates the radio communication/interference range of the wireless sensors (conceptually) with circles. The network includes a number of wireless nodes (sensor nodes and/or actuator nodes, which are referred to herein collectively as sensor nodes, and, correspondingly, a network including sensor nodes and/or actuator nodes is referred to herein collectively as a sensor network), such as tire pressure sensor 101, that communicate bidirectionally with a central unit CU. The intent of such network systems at the present time is to include non-safety-affecting sensors such as an air conditioner controller or a rear-view mirror motor sensor. Non-safety-affecting or other critical sensors or actuators such as wheel speed sensors or engine fuel injectors are expected to be considered for inclusion in future network systems after sufficient reliability performance of such networks has been demonstrated. The system carries heterogeneous wireless network traffic including a mix of periodic, aperiodic, and event-driven messages with a traffic footprint requiring a combination of soft real-time and non-real-time communication.

Major issues for the design of the wireless sensor network system illustrated in FIG. 1 include the use of a sufficiently high level of radio signal power from each of the nodes so that bit errors due to noise are minimized. The use of a high level of signal power increases the radio transmission range of the nodes, as schematically represented in FIG. 1 with the range circles, such as range circle 102. The resulting overlapping of radio transmission ranges leads to an increased level of intra-network interference, i.e., collisions among transmissions from multiple sensors, which must be minimized by utilization of appropriate communication protocols. Such communication protocols invariably introduce substantial communication overhead.

A number of approaches have been described for wireless sensor network MAC protocols that focus on dependability requirements for industrial applications. These protocols have been directed at requirements for ad hoc network operation, i.e., a network designed to readily accommodate added sensors, and therefore they share two major drawbacks. One drawback allows for dynamic node joining and timeslot allocation, which comes with increased communication overhead. A more important drawback is verifying the behavior and correctness of the overall communication system in a vehicle with such an arrangement, which is a sine qua non requirement in the automotive industry. Although these protocols provide optional timeslot allocation by including various TDMA (time division multiple access) protocol variants, the use of ad hoc timeslot reservation nonetheless relies on CSMA (carrier sense multiple access) protocols. Thus, the reservation mechanisms in these wireless sensor network arrangements inherently suffer from the uncertainty of intra-network collisions.

Figure 2:
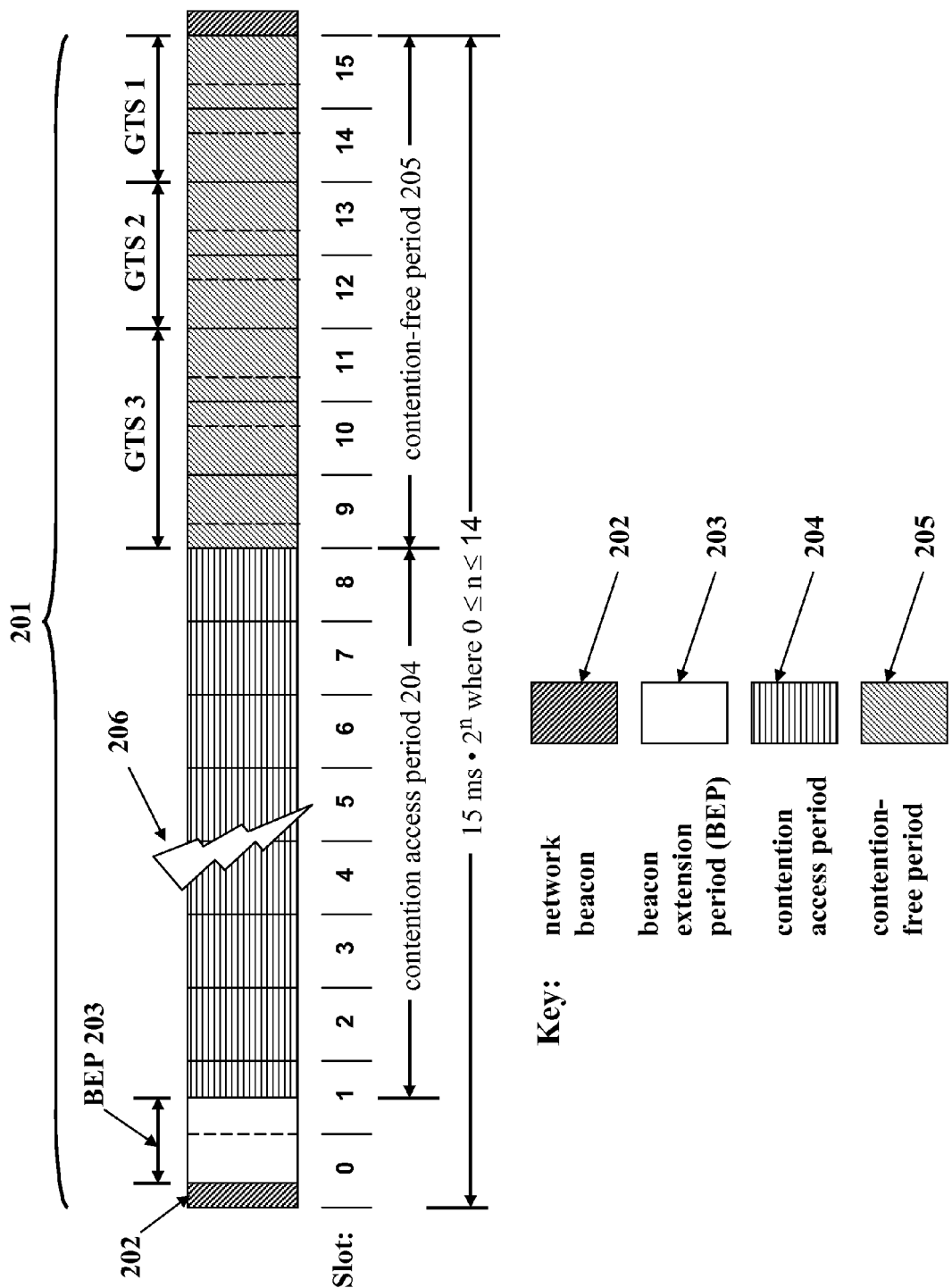
FIG. 2 illustrates an example of a conventional superframe of a wireless network MAC protocol described in IEEE Standard 802.15.4-2003.

Turning now to FIG. 2, illustrated is an example of a state-of-the-art superframe of the wireless local area network protocol described in IEEE Standard 802.15.4-2003, entitled "Wireless Medium Access Control (MAC) and Physical Layer (PHY) Specifications for Low-Rate Wireless Personal Area Networks (LR-WPANs)," which is hereby referenced and incorporated herein. This standard is representative of similar wireless sensor network protocols that have been used in the past, and is presumably the most noted since it is also used as a lower layer basis for the ZigBee protocol stack, as developed by the ZigBee Alliance and described in a ZigBee Specification (dated 2007), available online at http://www-.zigbee.org. The ZigBee Alliance is an association of companies directed at enabling wireless networking for monitoring and control products based on an open global standard.

FIG. 2 illustrates a superframe 201 spanning an exemplary time interval of 15 ms·$2^n$, for an integer $0 \leq n \leq 14$ that is selected depending on the needs of an application. A central unit transmits a network beacon 202 at the beginning of the superframe. The network beacon contains network information, frame structure, and notification of pending node messages, and enables the remote sensors to synchronize to the network beacon clock. Following the network beacon is a beacon extension period ("BEP") 203, which is space reserved for beacon growth due to pending node messages. A contention access period 204 is illustrated spanning slots 1 through 8 during which any node can access the central unit using a CSMA-CA (carrier sense multiple access-collision avoidance) protocol. Random transmission delays as well as collisions between simultaneous node transmissions are unavoidable in such a protocol, particularly between nodes that are sufficiently separated in distance that they cannot hear each other's carrier. Following the contention access period is a contention-free period 205 during which slots are reserved for nodes requesting a bandwidth allocation, i.e., the access mode for these slots is TDMA. A bandwidth allocation may cover a plurality of slots, as indicated in the figure by GTS 1, GTS 2, and GTS 3 ("guaranteed timeslots"). Thus, the contention-free period is accessed via a contention access period, indicating that transmission of a message remains a contention-encumbered process using the 802.15.4 protocol or a similar medium access control process.

It can be observed in FIG. 2 that this MAC protocol has two undefined periods where timing is dependent on the data and the network traffic. First, the "beacon extension period" can be enlarged for organization messages such as dynamic allocation of guaranteed timeslots ("GTSs") or specific node messages. Most notably, the request for a GTS allocation has to be transmitted in the contention access period and can be delayed (even for more than one superframe period) due to transmissions by other nodes of the same network, as indicated by the flash symbol 206 in the figure.

As introduced herein, a "Soft Real-Time Shared-Timeslot Medium Access Control Protocol" (SRTST-MAC) is employed to coordinate periodic, aperiodic, and event-driven periodic messages within a wireless sensor network, providing contention-free access for selected network nodes.

Since a deterministic time response is an essential requirement for particular industrial and automotive applications, this is the primary objective of the MAC protocol. Additionally, this feature is also an important basis for reliable feedback. By clearly defining when messages (or acknowledgment messages) should arrive, potential transmission failures can be advantageously detected with higher reliability.

Most of the existing CSMA/TDMA combined wireless MAC protocols are optimized for steady periodic data. The approach introduced herein considers a special-use case that lies between periodic and aperiodic network traffic.

The SRTST-MAC protocol supports nodes that may lie idle for an extended period of time, and after they are activated, produce periodic data bursts that may last an extended period of time. For that case, the protocol avoids collisions with other nodes, and ensures that re-allocation of the timeslots can be guaranteed within a defined period of time, presuming there are no external interferences.

The protocol assumes a simple star network topology in order to minimize latency, although the approach can be readily extended for a coordinated cluster-tree topology and for a combined wired-wireless topology as described hereinbelow.

Figure 3:
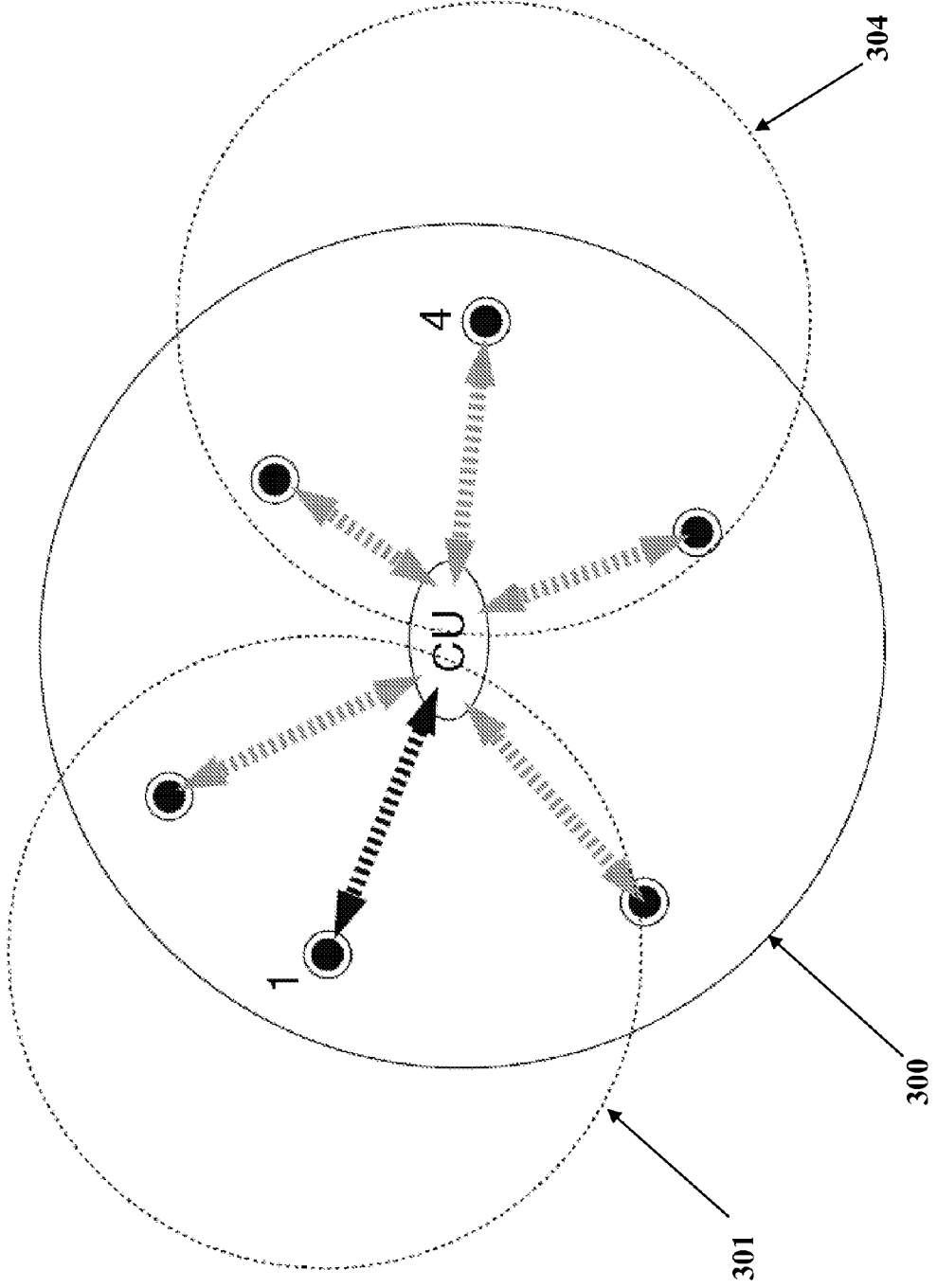
FIG. 3 illustrates a coverage map for a central unit communicating with six wireless sensor nodes.

Turning now to FIG. 3, illustrated is a central unit CU communicating in a star topology over a local area network with six wireless sensor nodes. The communication range of the central unit, as indicated in FIG. 3 with the circle 300, is sufficiently large to assure communication with each of the six wireless sensor nodes, such as nodes 1 and 4. However, the transmission range of nodes 1 and 4, indicated respectively with circles 301 and 304, is insufficient to reach all other sensor nodes. Accordingly, node 1 cannot perform carrier sense on a transmission from node 4, inherently resulting in collisions in a network designed with a currently known MAC protocol.

In a network design with an embodiment of a SRTST-MAC protocol, it is assumed that the radio transmission range of the central unit node is sufficient to reach all leaf nodes within the network. Since the central unit coordinates and broadcasts the timeslot allocation, the "hidden station problem" between individual leaf nodes can be avoided for the prioritized node traffic, such as between nodes 1 and 4 illustrated in FIG. 3. It is further generally assumed that a "central unit" as used herein is not restricted to a single unit, but may be a distributed central unit, such as several central unit elements coupled via a fieldbus. A distributed central unit may be included in a system designed to provide redundancy, or for other purposes such as to provide a wider radio coverage range.

Figure 4:
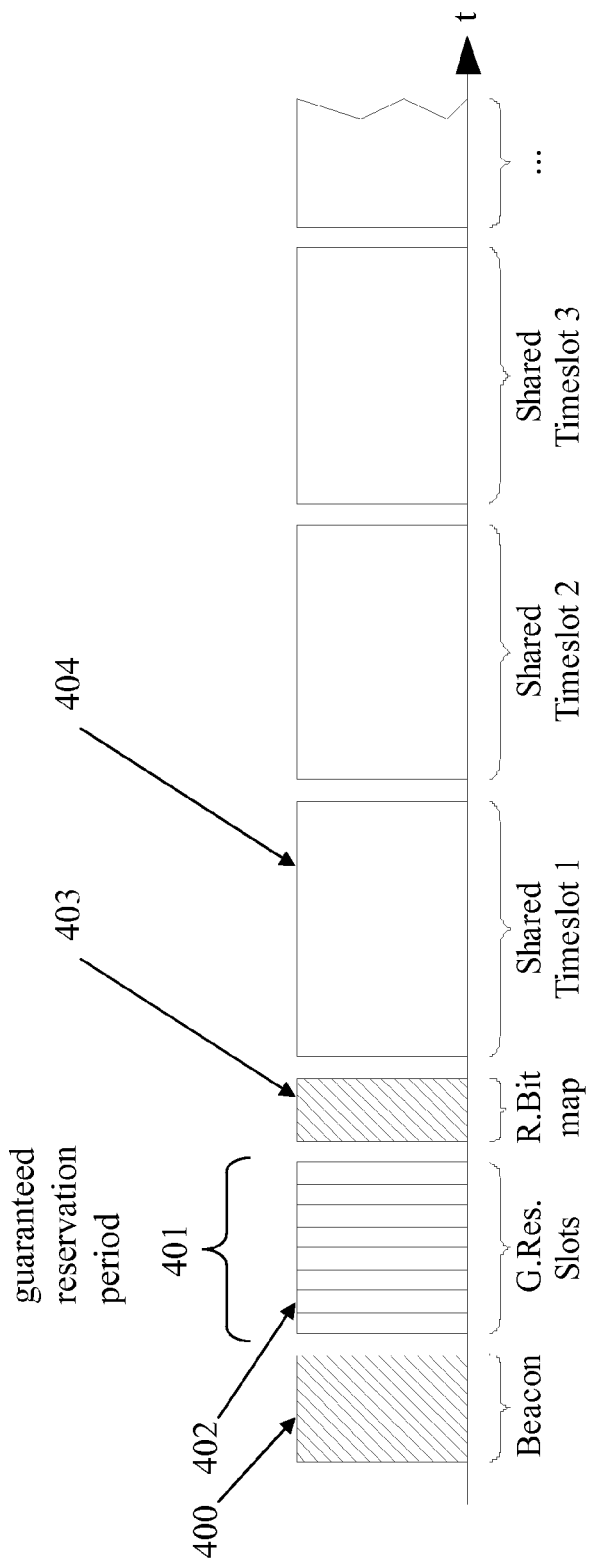
FIG. 4 illustrates a wireless MAC superframe providing contention-free access for selected wireless network nodes, constructed according to an exemplary embodiment.

Turning now to FIG. 4, illustrated is a SRTST-MAC superframe providing contention-free access for selected network nodes, illustrating an embodiment of a MAC protocol as introduced herein. As illustrated in FIG. 4, instead of only separating the data slots into a contention-access and contention-free period as employed in conventional protocols, a SRTST-MAC superframe includes of a beacon subframe 400, broadcast by the central unit, and a "guaranteed reservation period" (GRP) 401. The beacon frame allows the network nodes to synchronize to the beacon's clock, and may perform other general coordination tasks. The GRP is split into a pre-determined number of "guaranteed reservation slots" (GRSs), such as guaranteed reservation slot 402, that are dedicated to specific (pre-selected) time-critical nodes. The guaranteed reservation slots are short slots that only include a short preamble and optional redundant information to identify a node number to the central unit. A reservation bit map ("R. Bit map") subframe 403 is broadcast by the CU. The CU, preferably centrally located, transmits the beacon frame and the reservation bit map train with sufficient power that it can be heard by all network nodes. A fixed number of so-called "shared timeslots," such as shared timeslot 404, follows the reservation bit map frame. If previously reserved, a shared timeslot is used in a TDMA communication mode only for the designated time-critical node. If not currently reserved, a shared timeslot can be used by other generic nodes with more relaxed timing constraints with a CSMA-based shared access protocol. The time-critical nodes can be prioritized so that the most critical of them are assigned the earliest shared timeslots.

Figure 5:
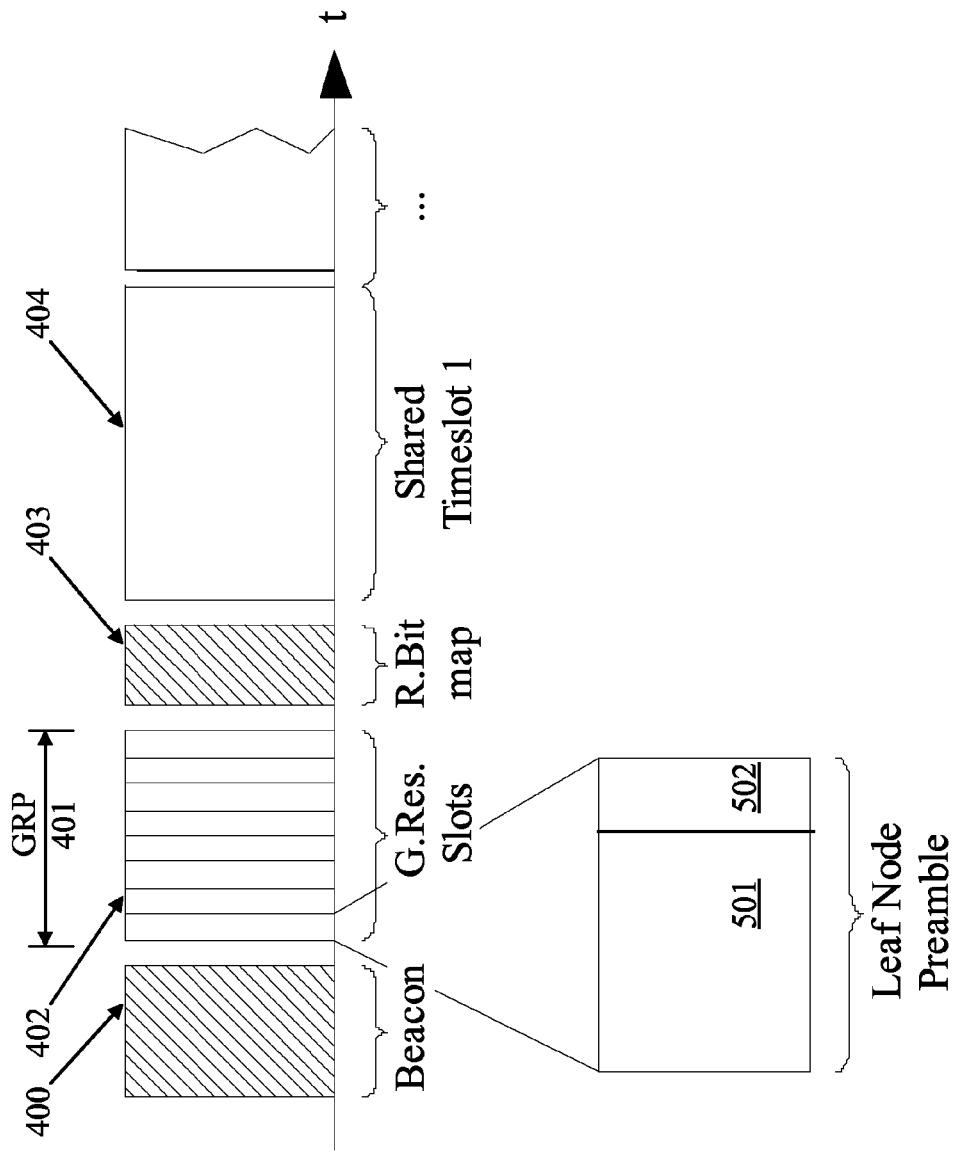
FIG. 5 illustrates an embodiment of a guaranteed reservation slot in a guaranteed reservation period, constructed according to an exemplary embodiment.

Turning now to FIG. 5, illustrated is a guaranteed reservation slot in the guaranteed reservation period. A leaf node could be any node except the central unit. It is important that the GRP immediately follows the beacon frame. Since all nodes which have data to transmit first listen to and align their clocks with the beacon frame, they are well synchronized after this event. Thus, it can be ensured that time deviation due to different clock drifts among the nodes is minimized, and the time-critical nodes will correctly receive their dedicated GRS slot. Furthermore, since the GRS only consists of a special, short preamble, the overall time that is exclusively dedicated to the time-critical nodes is very low in comparison to full TDMA data slots in other protocols, which provides a key performance-enhancing factor of an embodiment.

It has to be emphasized that the wireless reservation protocol described herein (using such special wireless preambles) is inspired by the idea of the state-of-the-art "basic bit-map protocol," but improved for the nature of wireless data encoding and transmission. Such "basic bit-map" (and related) protocols are only directly applicable to wire-based communication, since they require the nodes to transmit only a single bit in the reservation bit-map and simultaneously listen to the bus and receive and check the bit-map. In contrast, conventional wireless encoding and transmission schemes such as frequency or phase modulation cannot be used for single bit-wise arbitration, because the receivers need to be synchronized with specific preambles. Furthermore, the nodes cannot simultaneously receive the reservation bit-map of the other nodes because of the asymmetric nature of wireless transmission (similar to the hidden terminal problem).

It should be noted that the performance gain in an embodiment of the SRTST-MAC protocol depends on an appropriate underlying PHY layer. Thus, the SRTST-MAC protocol should be used in combination with an appropriate physical layer. Either by using an appropriate digital signal processing hardware unit or a low-power microcontroller, it should be ensured that short and configurable preambles can be detected with low overhead. Thus, a GRS frame should be as short as possible. A GRS frame preferably consists of only a single configurable reservation-preamble 501 which has to be different from the preambles transmitted by the central unit (e.g., a preamble identifying a subnet, or a comparable mechanism) or optionally the reservation preamble followed by only a few bits 502 to identify the transmitting leaf node. Since a specific leaf node is only allowed to transmit its reservation request in its pre-determined slot, this identification information is useful as a redundancy check to detect faulty messages or messages from faultily synchronized nodes.

Figure 6:
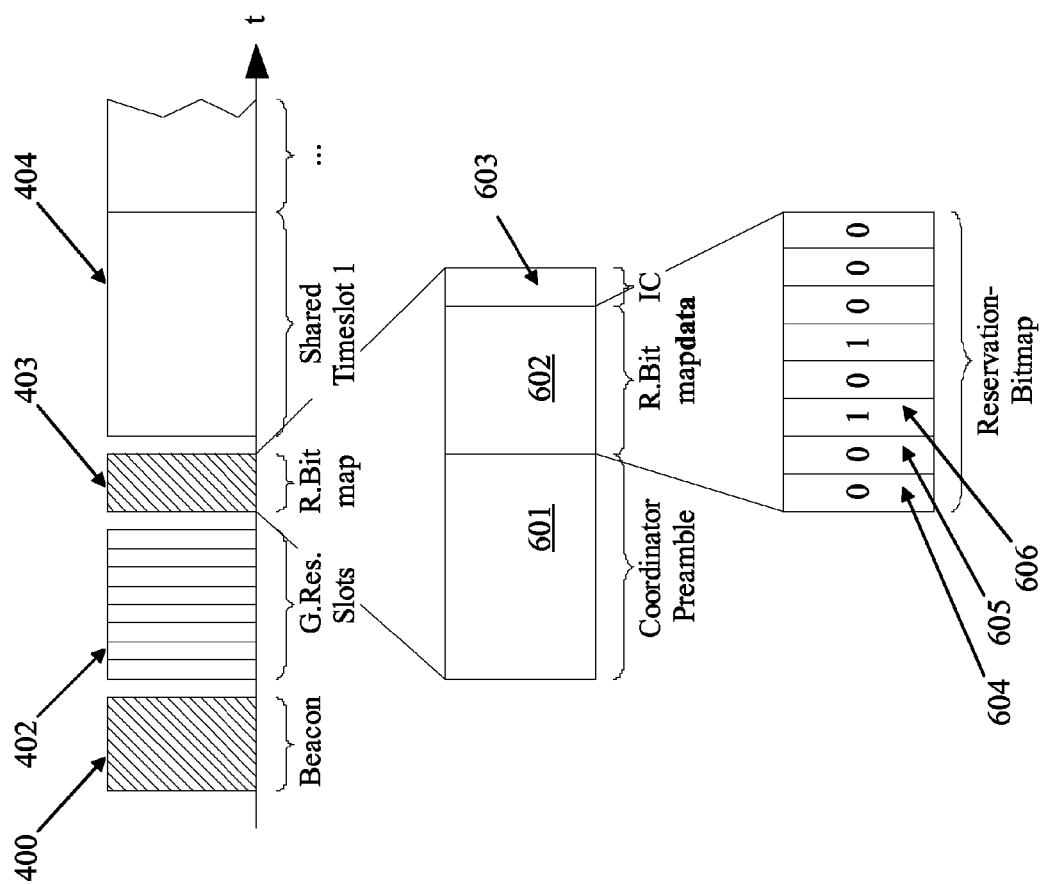
FIG. 6 illustrates a reservation bit map subframe in a medium access control protocol, constructed according to an exemplary embodiment.

Turning now to FIG. 6, illustrated is an embodiment of a reservation bit map subframe in an embodiment of an SRTST-MAC protocol. A reservation bit map subframe is broadcast by the CU with sufficient power to be received by each node within the wireless network. A node with data to transmit in that superframe must first receive and check the reservation bitmap. This subframe is kept very short in order to avoid overhead, and indicates, preferably by a simple bitmap, which shared timeslot is currently reserved by a time-critical node in that superframe period. Optionally, the frame could provide additional information such as the current transmission direction (upload/download), if needed.

In the example illustrated in FIG. 6, the first two zeros, 604 and 605, illustrated in the reservation bit map 602 indicate that the first two shared timeslots are free, i.e., they are currently not reserved. The one in the third bitmap position 606 identifies a reserved timeslot for a particular preassigned time-critical node. The following zeros and ones have similar meanings.

The label "IC" 603 following the reservation bit map represents an "integrity code." An integrity code, for example, may be a checksum including one or two bits to ensure the integrity of the reservation bit map. The design of an integrity code is dependent on the particular implementation, and can be more extensive than a checksum, such as a cyclic redundancy check in applications requiring a forward error correcting process. However, an integrity code would ordinarily be limited to a couple of bits to reduce overhead in the transmission process.

The Coordinator Preamble 601 is a bit sequence used as a receiver hardware synchronization pattern and to identify the central unit.

Figure 7:
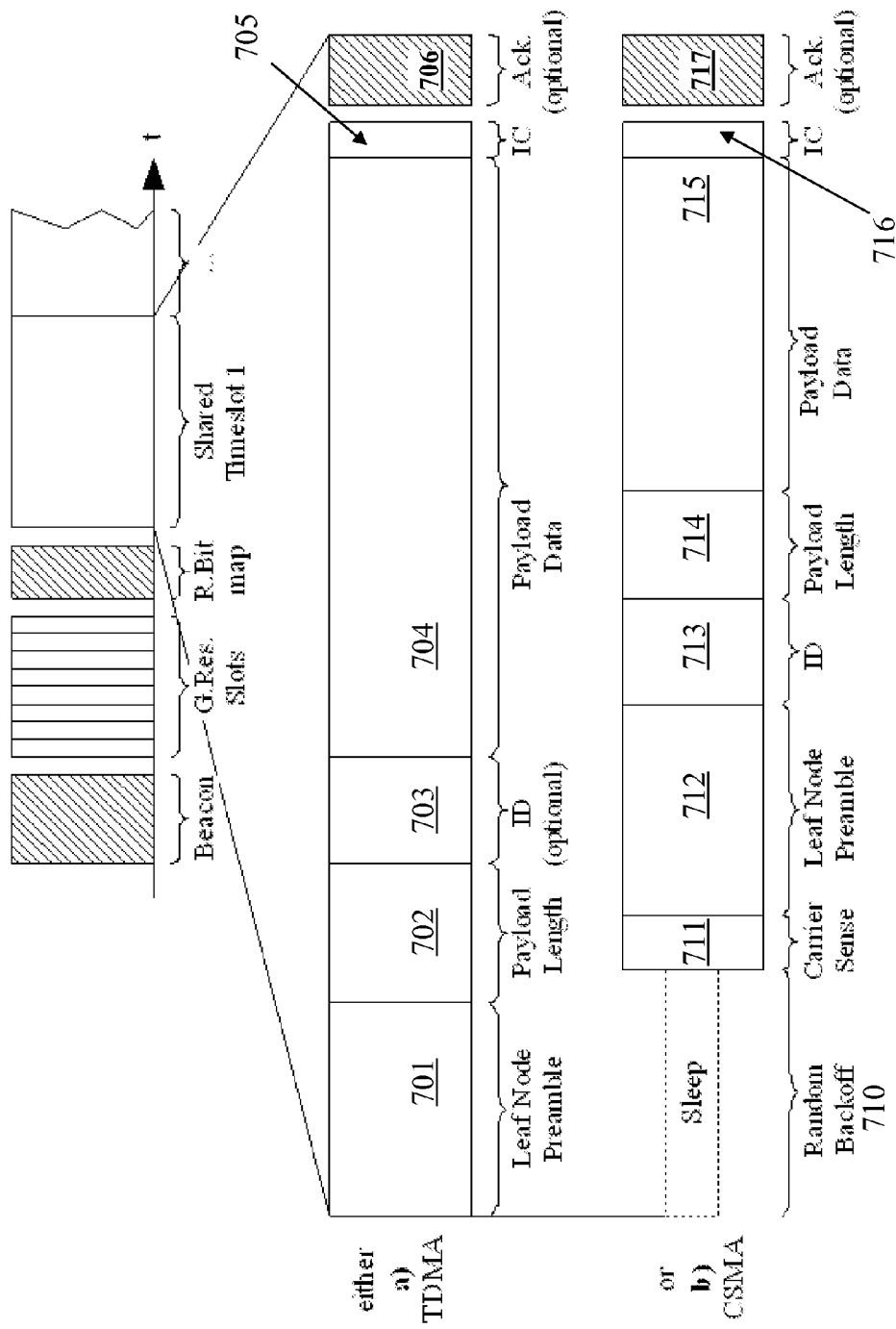
FIG. 7 illustrates an exemplary structure of a medium access control protocol for a shared timeslot that may be transmitted in a TDMA or a CSMA communication mode, constructed according to an exemplary embodiment.

Turning now to FIG. 7, illustrated is an exemplary structure in an SRTST-MAC protocol embodiment for a shared timeslot that may be transmitted in a TDMA or a CSMA communication mode. Shared timeslots are used either by time-critical TDMA nodes or CSMA nodes, according to the reservation bitmap of the current superframe. FIG. 7 depicts two possible cases, case a), a TDMA transmission of a time-critical node that can use the whole timeslot, and case b), a CSMA transmission (e.g., data of a short event) after a random back-off time from nodes with relaxed timing constraints. Thus, in a TDMA mode, the subframe sequence of fields in a shared timeslot includes a leaf node preamble 701 for receiver hardware synchronization and to identify the frame type (TDMA or CSMA), a payload length field 702 identifying the size of the payload data, an optional ID field 703 that may be 8 or 16 bits that provides additional redundant identification of the transmitting node, fields containing the actual payload data 704, the integrity code 705, and an optional acknowledgment message 706. The acknowledgment message may be included to address the hidden station problem. In a CSMA mode, the subframe sequence of fields in a shared timeslot includes a random back-off interval 710 during which the transmitting node sleeps, a carrier-sense field 711, wherein if no carrier is detected the transmitting node transmits a leaf node preamble 712. Following the leaf node preamble, an ID field 713 is transmitted, which is a critical field for a node operating in a CSMA mode. Then a payload length field 714 is transmitted, followed by the payload data 715, an integrity code field 716, and an optional acknowledgment message 717.

The optional acknowledgment message can be implemented either by transmitting an acknowledgment message in the same shared timeslot or, for example, in the same timeslot of the next superframe. The following timeslot is kept reserved in this case. Since the implementation of an acknowledgment message depends on the actual application requirements, it is need not be defined in this protocol.

The order of the dedicated GRS and Shared Timeslots can be optionally chosen to prioritize the time-critical TDMA-nodes, since earlier slots provide a shorter communication delay.

Figure 8:
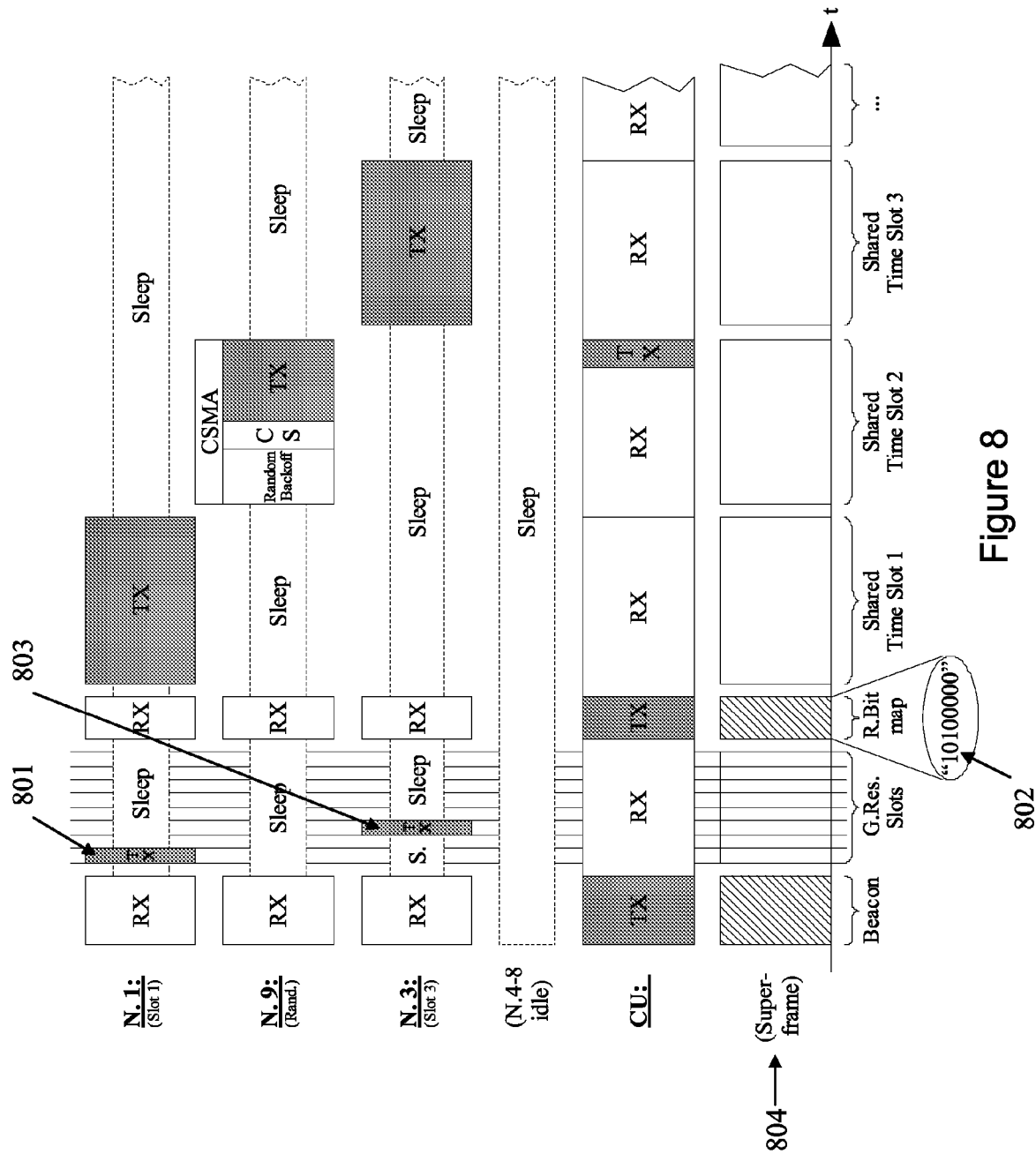
FIG. 8 illustrates an example of data communication flow in a wireless sensor network using a medium access control protocol in an embodiment consisting of eight time-critical TDMA nodes with dedicated guaranteed reservation slots.

Turning now to FIG. 8, illustrated is an example of data communication flow in a wireless sensor network using the SRTST-MAC protocol in an embodiment consisting of eight time-critical TDMA nodes with dedicated GRS (nodes 1-8). FIG. 8 illustrates in the upper portions of the figure receive ("RX"), transmit ("TX), and sleep patterns for the several nodes and for the central unit, and assigned slot numbers for the time-critical nodes, such as slots 1 and 3 indicated in FIG. 8 at 801 and 803. In addition, at the bottom of the figure, the structure of an embodiment of a superframe 804 is illustrated. In this example, time-critical TDMA nodes "N.1" and "N.3" are re-activated after an extended idle period. These time-critical nodes need to transmit within this superframe to provide time continuity for time-critical processes. Therefore, these nodes first wait for a central unit beacon, so that they are re-synchronized, and then transmit their reservation requests in their dedicated GRSs. They then receive and check the reservation bitmap transmitted by the central unit. If a "1" is received in their respective bitmap position, e.g., 801 and 803, their request was correctly received and answered by the central unit. It is then safe for these nodes to transmit in their pre-reserved shared timeslot.

Other CSMA nodes with lower priority are also prepared to transmit, but with relaxed timing constraints. For example, node "N.9" is prepared to transmit in the next free or randomly released slot. Therefore the node "N.9" receives the current reservation bitmap. As indicated in FIG. 8, the reservation bitmap is "0" at shared timeslot 2, 804. Thus, the lower priority node "N.9" contends for access in shared timeslot 2. An optional randomization mechanism can be used, so that the CSMA nodes select one of the free slots by random instead of always the first free slot, in order to reduce the collision probability of the CSMA protocol.

Recognizing that contention for time-share slots can be resolved using a MAC protocol for a WSN, the issue of using a WSN in a harsh industrial or automotive environment with its susceptibility to radio noise and interferences can be resolved, as introduced herein, by the use of an adaptive hybrid virtual star network topology. In this topology, existing wired fieldbus and wireless sensor networks are combined to improve the dependability of wireless communication with network nodes. A special adaptive hybrid topology approach is used. A combined MAC/routing protocol is preferably employed to utilize the advantages of this hybrid topology. The combination of the hybrid topology and the MAC/routing protocol improves the dependability of the wireless communication compared to wireless sensor networks using conventional topologies.

Conventional network topologies are used, for example, for a wired ring network to define a logical master, which is then used as a central coordination and relay station in a logical star topology. As an enhancement, an "adaptive hybrid virtual star" topology includes a wireless sensor network integrated with a wired fieldbus arrangement to form a coordinated network that appears as a star network to the sensor nodes, creating thereby a "virtual central unit." In a conventional multi-hop wireless sensor network topology, a sensor node needs to contain logic or additional hardware (such as for signal strength analysis) to decide a routing path to a central unit. As introduced herein, a sensor node need not contain such routing logic. The central unit controls the responding gateway, and the sensor nodes merely transmit to a virtual central unit.

Figure 9:
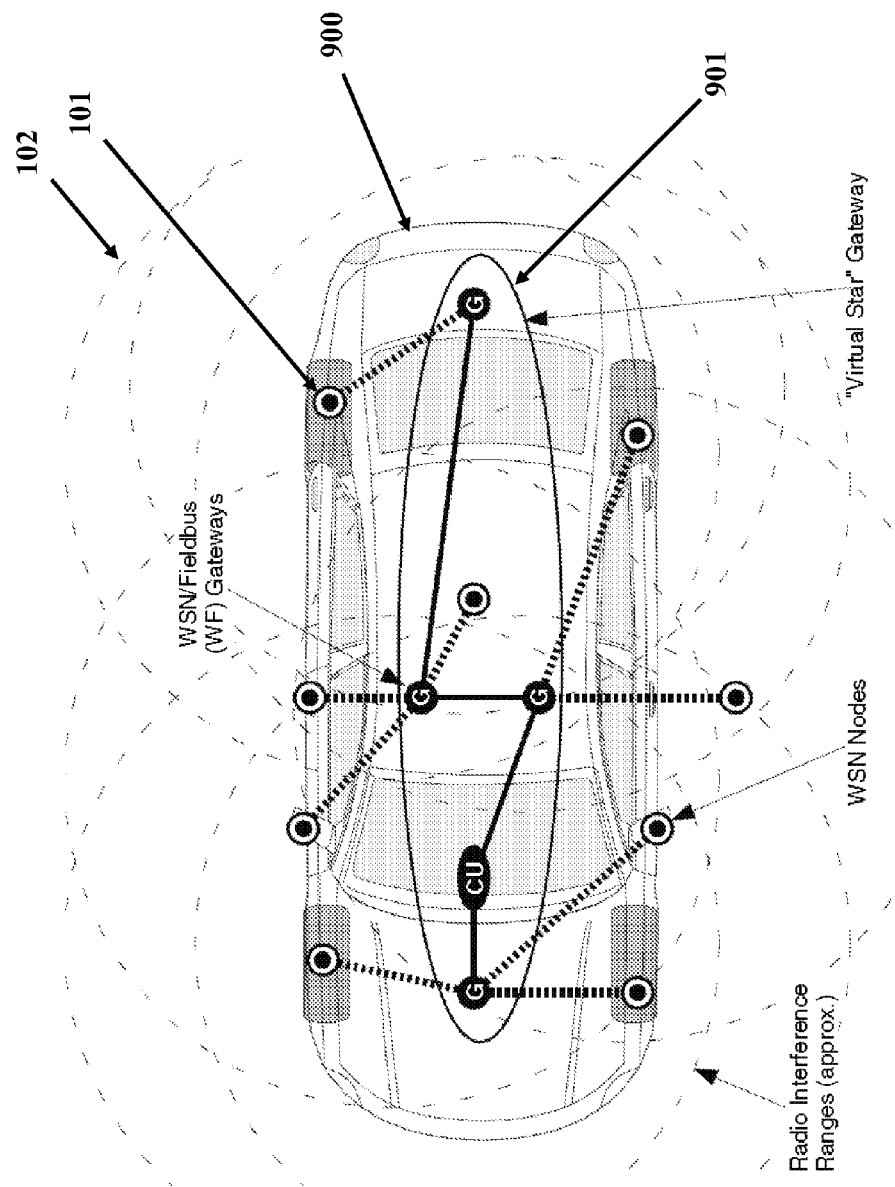
FIG. 9 illustrates an adaptive hybrid virtual star topology in an exemplary automotive application, constructed according to an exemplary embodiment.

Turning now to FIG. 9, illustrated is a hybrid virtual star topology in an embodiment of an exemplary automotive application. The figure illustrates the outline of a vehicle 900. The hybrid network is a "virtual star" network because it is handled as a logical star topology, i.e., the "Virtual Star" gateway 901, from the perspective of the wireless sensor nodes ("WSN Nodes"), but not from the perspective of the wired network. The network is "adaptive" because the downlink (gateway to sensor) wireless communicating node of the logical star is dynamically adapted to the conditions and quality of the wireless links. The hybrid virtual star topology includes gateways (represented with the symbol "G") that may be coupled to the central unit and to each other. The structure of the network optimizes the simplicity of the sensor nodes.

The hybrid virtual star topology has two major advantages for industrial or automotive applications. One is that the network topology reduces the number of cables for a number of end nodes in comparison with a conventional pure-wired network, and therefore increases the flexibility of deployment and node mounting arrangements. Another is that susceptibility of wireless communication to internal and external interference sources can be significantly reduced by adding gateways that can be easily integrated into the existing wired infrastructure.

The MAC protocol employed in a network constructed with a hybrid virtual star topology is able not only just to replace some wireless with wired connections and to use multi-hop routing therebetween, but also to optimize a combined MAC and routing layer for higher dependability, especially for resource-limited wireless end devices that appear to operate with the simplicity of a star network topology.

The network is assumed to consist of a wired fieldbus that can be either time triggered (e.g., as in commercial products such as FlexRay, TTCan, etc.), or can include a prioritized event-based bus (e.g., as in commercial products such as CAN with arbitration on message priority, LIN, etc.) that is connected to a central unit and that uses an existing wired infrastructure such as found in many industrial or automotive applications.

The network is also assumed to consist of a wireless sensor (and actuator) network of devices with a microcontroller and radio transceivers. Since the application primarily would be optimized for integrated low-power devices, the MAC protocol is assumed to be oriented toward transceivers with less complex wireless communication features, such as single-channel ISM (industrial, scientific, and medical) band radio devices, in contrast to multichannel arrangements used in LANs such as Bluetooth or in WLAN transceivers.

The WSN/fieldbus gateways are included in the network to perform two tasks. One task is to receive wireless messages and forward them to the CU over the wired fieldbus. A second task is to receive messages from the CU over the fieldbus, and transmit (i.e., broadcast) them to the wireless nodes.

It is assumed further that the transmission power of the radio transceivers is chosen to have sufficient transmitted power so that most of the wireless nodes can reach more than one gateway with adequate signal-to-noise ratio (SNR) and with adequately low BER. Since this increases the radio interference ranges, as illustrated diagrammatically with the dashed circles in FIG. 9 such as circle 102, it is assumed that a TDMA-based wireless MAC protocol, preferably a TDMA-based wireless MAC protocol as introduced hereinabove, is used to avoid intra-network collisions and interference.

The protocol, constructed in an embodiment, extends the wireless star network to a hybrid virtual star topology for a node-to-CU link by the gateways forwarding messages from the wireless nodes to the CU. However, the wireless nodes themselves are not required to handle addressing or routing, which is especially suitable for devices with limited hardware resources. In conventional WSN routing protocols, a node analyzes possible routing options and implicitly chooses and addresses a gateway, which then forwards the received message, generally to the CU, and consequently requires more memory and computing power.

In a network employing a hybrid virtual star topology, the WSN nodes operate similarly to a node in a star network. Accordingly, a node broadcasts its message without addressing a gateway, but simply addresses the CU. Consequently, all gateways that receive the message measure and append a link quality indicator (e.g., a received signal strength indicator) value and forward this message to the CU over the wired fieldbus. Since wireless messages can arrive at a gateway almost simultaneously, the use of a time-triggered fieldbus is preferable, as illustrated and described hereinbelow with reference to FIG. 11. Otherwise, the gateways should at least have different priorities when accessing the fieldbus.

There are two properties of the hybrid virtual star topology that can increase the redundancy and dependability of the network. One property is that multiple copies of the full message can be received by the CU, because they can be forwarded by multiple gateways. Another property is that partly or improperly received messages, including bit errors, from different gateways arrive at the CU. These message portions can be combined by the CU to reconstruct the message with improved reliability. This property, of course, depends on hardware and encoding features included in the network that enable combining message portions.

The protocol to extend the wireless star network to a hybrid virtual star topology for a CU-to-node link with enhancement for adaptive hybrid message routing is described as follows: The extension increases message reliability when transmitting radio messages from the CU to the wireless sensor nodes. There is more than one gateway included in the network topology to transmit a radio message in a downlink to a sensor node. Thus, there are different routing options from the perspective of the wired fieldbus network. However, since overlapping radio interference areas are assumed as illustrated in FIG. 9, a CU message routed to a sensor node cannot just be broadcast to all gateways in order to increase redundancy, because this could produce radio collisions in some areas. Accordingly, the CU analyzes the radio link quality indicator (LQI) values of the different wireless nodes corresponding to the different gateways. This requires the CU to store, average, or preferably perform a statistical operation on the received LQI values, for example, G. 1 ("gateway 1") to Node 2=LQI 132, G. 1 to N3=LQI 87, G. 2 to N2=LQI 65, etc. . . . . As a result of the analysis, the CU forwards the message only to the gateway with the best LQI to the addressed wireless node for transmission to the target node. This ensures that the message will be received correctly with higher probability by the wireless node, and increases the dependability of the overall network. This mechanism is referred to herein as adaptive virtual star topology, because from the perspective of a wireless sensor node there is still only one central star gateway, although the gateways are adaptively selected. There is no corresponding requirement that a sensor node measure a link quality indicator. The sensor node also does not need to know that the star gateway is adaptively selected according to radio link quality, which can dynamically change over time, for example, as vehicle occupancy or the external electromagnetic noise environment of the vehicle changes. The selected gateway waits for the wireless MAC timeslot of the addressed node, and then transmits the message over the radio transceiver. It is assumed that all gateways and sensor nodes share the same wireless MAC protocol scheme.

Optionally, a CU can address multiple gateways successively in descending LQI order that re-transmit copies of the message, preferably with the same sequence ID. The timing for this option requires enhanced coordination with the underlying WSN MAC implementation, such as the use of successive, redundant timeslots.

Figure 11:
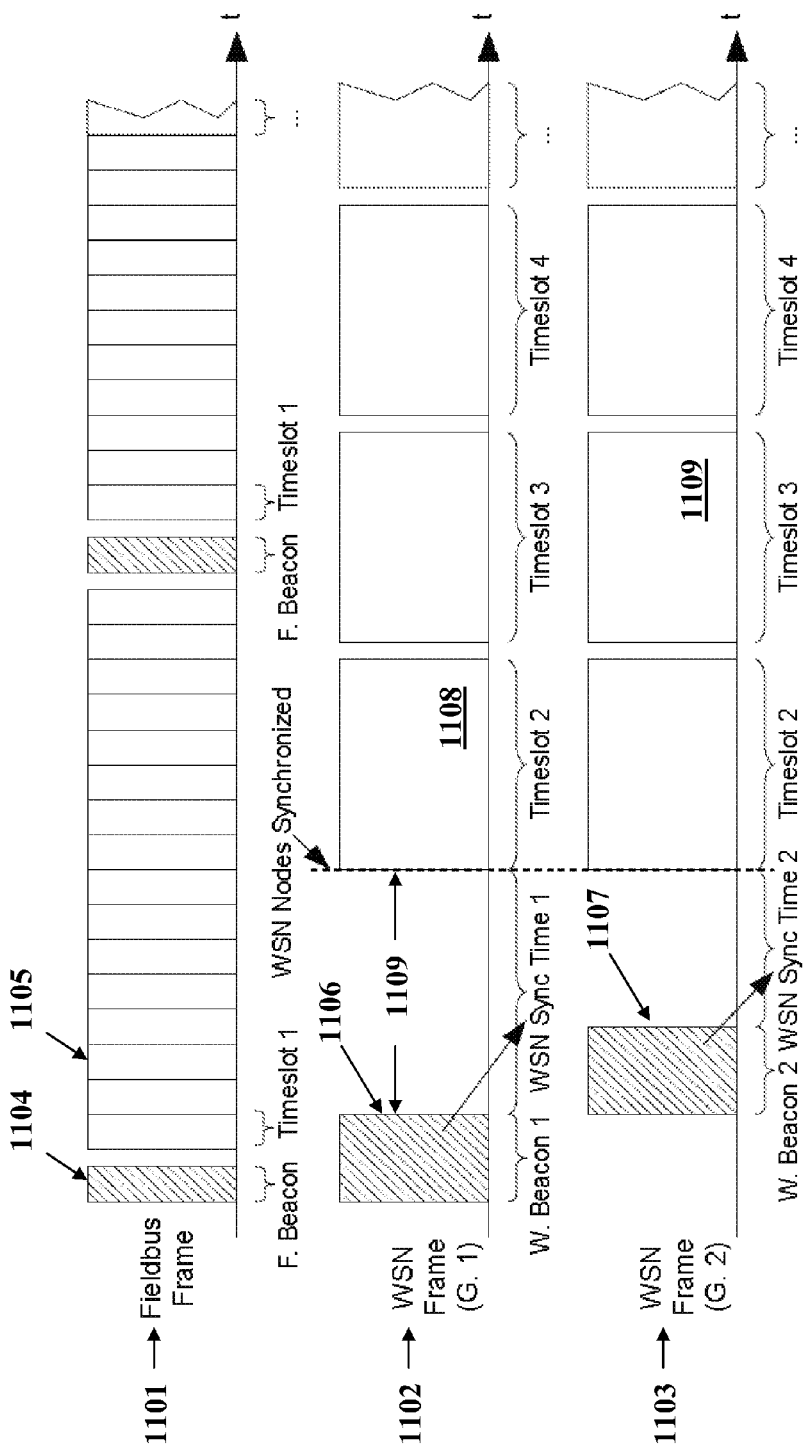
FIG. 11 illustrates an exemplary structure of coordinated wired fieldbus and wireless sensor network MAC superframes of the adaptive hybrid virtual star protocol corresponding to a topology constructed according to an exemplary embodiment.

The MAC protocol can also centrally manage synchronization of the wireless sensor network, which is necessary for a TDMA collision-avoidance MAC protocol, as illustrated, for example, in FIG. 11. After receiving a specific fieldbus beacon or broadcast package transmitted by the CU, different gateways broadcast their wireless beacons in succession with a predefined delay (i.e., with different "WSN Sync Time" values). This ensures that the beacons will be received by the nodes without radio collisions, and that all WSN nodes are synchronized to the same time-slot scheme (by providing "WSN Sync Time" values).

Turning now to FIG. 11, illustrated is an exemplary structure of the coordinated wired fieldbus and wireless sensor network MAC superframes of the adaptive hybrid virtual star protocol in an embodiment corresponding to the topology illustrated and described with reference to FIG. 9. In this embodiment, the two wireless/fieldbus gateways (gateway G. 1 and gateway G. 2) are connected to the CU by the wired fieldbus. In the top portion of the figure, a fieldbus frame 1101 is illustrated showing a fieldbus beacon 1104 that is transmitted by the central unit to provide synchronization directly for the wired fieldbus portion of the network. Following the fieldbus beacon are bidirectional timeslots for communication between the central unit and the gateways such as fieldbus timeslot 1105. It has to be noted that the actual frame structure of the wired network portion depends on the underlying fieldbus implementation which in most cases will be a conventional standard fieldbus system.

The frames 1102 and 1103, respectively, illustrate the wireless protocol transmitted by gateway 1 ("WSN Frame G. 1") and gateway 2 ("WSN Frame G. 2") for the wireless portion of the network. Each gateway wirelessly transmits a non-overlapping beacon such as beacons 1106 and 1107 corresponding respectively to gateways G. 1 and G. 2 to provide synchronization for the wireless portion of the network. The gateways synchronize their non-overlapping beacon transmissions either by using the beacon 1104 or another specific pre-defined fieldbus packet broadcast by the central unit over the wired portion of the network. Each gateway utilizes a gateway-specific delay, such as delay 1109 for gateway G. 1 and adds its individual delay information to its beacon packet to synchronize their respective wireless timeslots. Thus, all timeslots of the wireless network utilized by the different gateways are finally synchronized to a common schedule coordinated by the central unit. The gateway delays are preferably transmitted to the gateways by the central unit. Using a MAC protocol the central unit preferably allocates a non-overlapping timeslot to each gateway to prevent data collisions at the sensor nodes, i.e., the protocol utilized is preferably TDMA.

Figure 10:
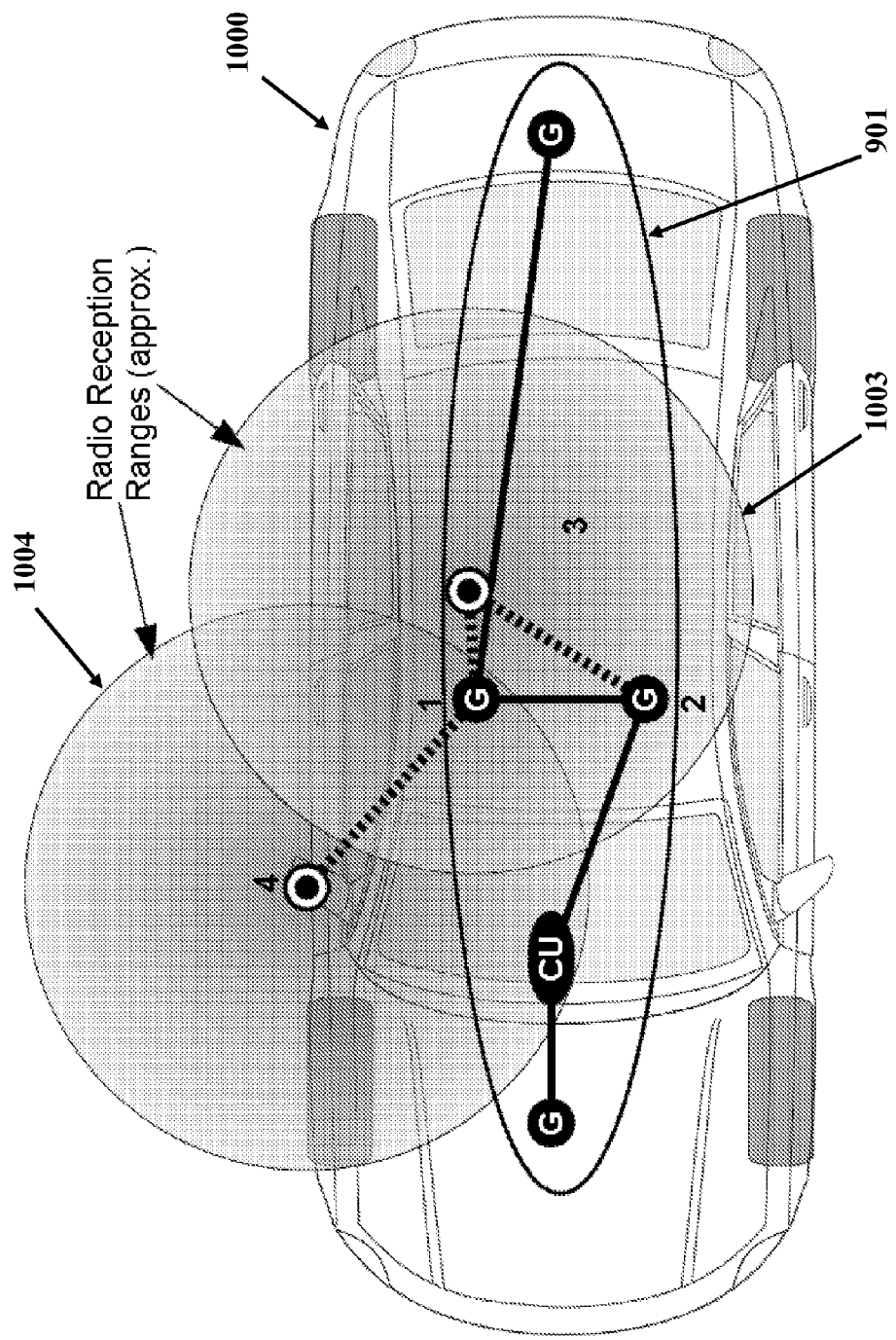
FIG. 10 illustrates an exemplary coverage map for a wired-wireless sensor network formed in a vehicle with an adaptive hybrid virtual star topology, constructed according to an exemplary embodiment.

Turning now to FIG. 10, illustrated is an exemplary coverage map for a wired-wireless sensor network constructed with an adaptive hybrid virtual star topology, in an embodiment formed in the vehicle 1000. The network includes a central unit CU coupled to gateways "Gs" over a wired fieldbus. The gateways are coupled to wireless sensor nodes, such as the wireless sensor nodes 3 and 4 illustrated in the figure. The gateways form a virtual sensor unit represented by the ellipse 1002. The bidirectional radio reception ranges of the wireless sensor nodes 3 and 4 are represented with circles, such as circles 1003 and 1004, respectively. Thus, sensor node 3 can communicate in an uplink with gateway 1 and gateway 2, but sensor node 4 can communicate only with gateway 1 due to their different separation distances. Messages transmitted by node 3 are in the radio reception range of both gateways (gateway 1 and gateway 2), which are configured to enable a higher level of redundancy. In contrast to the respective radio reception ranges wherein messages can be received with high probability, the radio interference ranges (not shown) are still larger, producing noise at more distant nodes so that the wireless MAC preferably should be structured to avoid collisions within a larger reception area.

Figure 12:
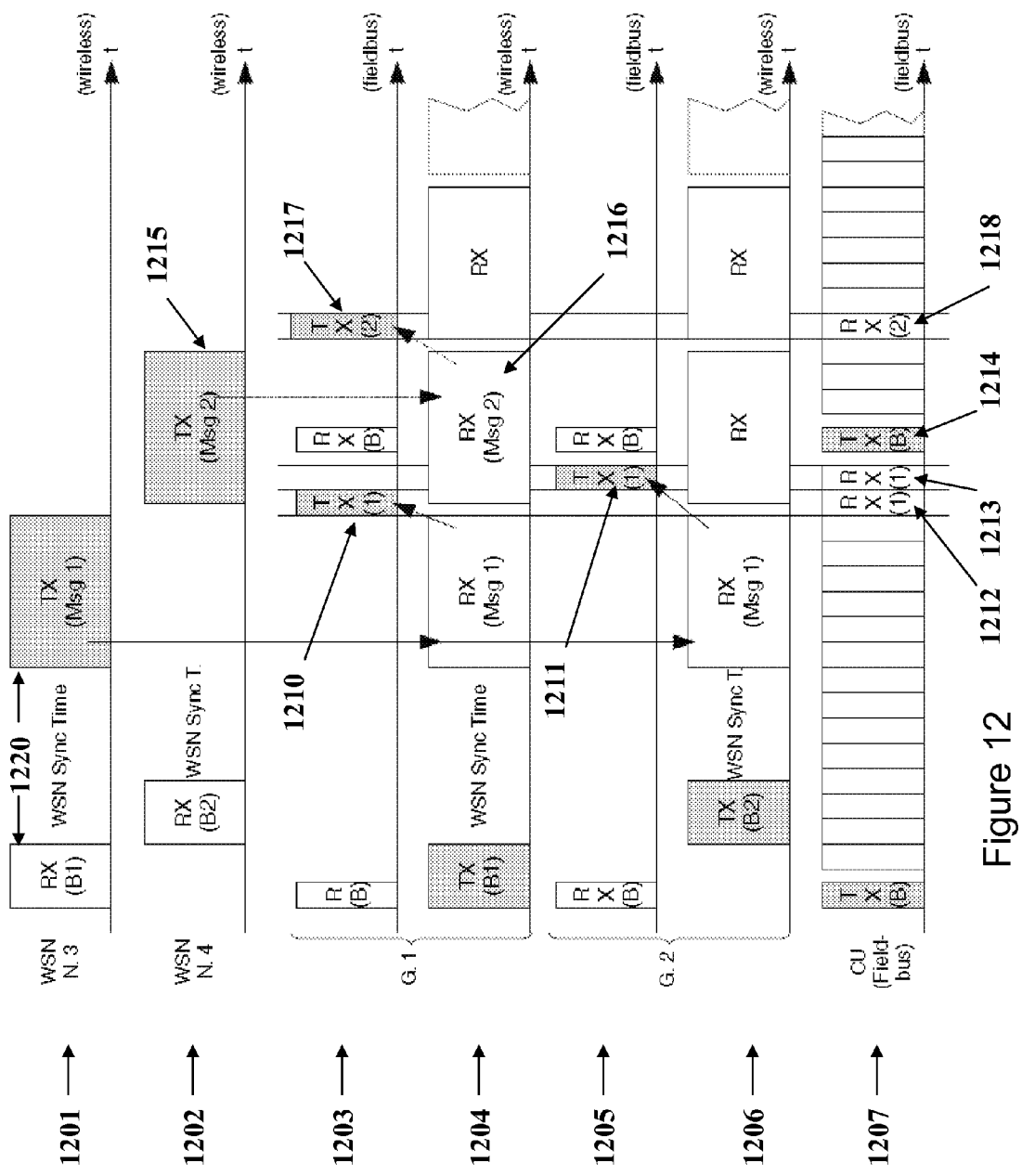
FIG. 12 (illustrating node-to-CU communication) and FIG. 13 (illustrating CU-to-node communication) illustrate protocol timing sequences of an adaptive hybrid virtual star protocol in a wireless star network such as illustrated and described with reference to FIG. 10, constructed according to an exemplary embodiment.

Turning now to FIG. 12, illustrated is a timing diagram of an adaptive hybrid virtual star protocol, illustrating the protocol timing sequence for node-to-CU communication in an exemplary embodiment with reference to the topology and coverage map of FIG. 10. In time sequences 1201 and 1202, sensor nodes N. 3 and N. 4 transmit and receive messages over the wireless portion of the network. In time sequence 1203 gateway G. 1 transmits and receives messages over the wired fieldbus portion of the network, and in time sequence 1204 it transmits and receives messages over the wireless portion of the network. Similarly, in time sequence 1205 gateway G. 2 transmits and receives messages over the wired fieldbus portion of the network, and in time sequence 1206 it transmits and receives messages over the wireless portion of the network. In time sequence 1207 central unit CU transmits and receives messages over the wired fieldbus portion of the network. Each gateway utilizes a gateway-specific delay, such as delay 1220 for gateway G. 1, to synchronize their respective wireless timeslots.

In a first example, a wireless sensor node initiates a message that is transmitted to the central unit. WSN node "N. 3" transmits "Message 1" in its allocated time slot. Since both gateways (G. 1 and G. 2) are in overlapping radio reception ranges, they both receive this message and immediately append their measured received signal strength as a link quality indicator (LQI) to the message. Each gateway transmits the received message with the appended link quality indicator to the central unit over the wired fieldbus portion of the network. Since both gateways receive this message at nearly the same time (with radio propagation delay neglected), the forwarding mechanism and the wired fieldbus access has to be coordinated. In this example, a time-triggered fieldbus is assumed, wherein it is predefined that gateway G. 1 transmits before gateway G. 2 (as represented by in timeslot 1210 before the transmission represented in the timeslot 1211).

The CU receives two redundant copies of "Message 1" over the wired fieldbus portion of the network (as represented in the timeslots 1212 and 1213, which may be indicated by the same sequence number) in consecutive fieldbus time slots. If the CU is configured to transmit a message back to "N. 3" (e.g., an acknowledgment message), it would compare the received LQI values of both copies of "Message 1," and transmits the message to the gateway with the better link quality (not shown in FIG. 12).

In a second example, WSN node "N. 4" transmits "Message 2" (1215) in its allocated time slot. In this example, only gateway G. 1 is in radio reception range (or other redundant gateways are disturbed by noise), and it receives (as represented in the timeslot 1216) and forwards (as represented in the timeslot 1217) the message over the wired fieldbus. The message is then received by the central unit (as represented in the timeslot 1218) for further processing or response as necessary.

Figure 13:
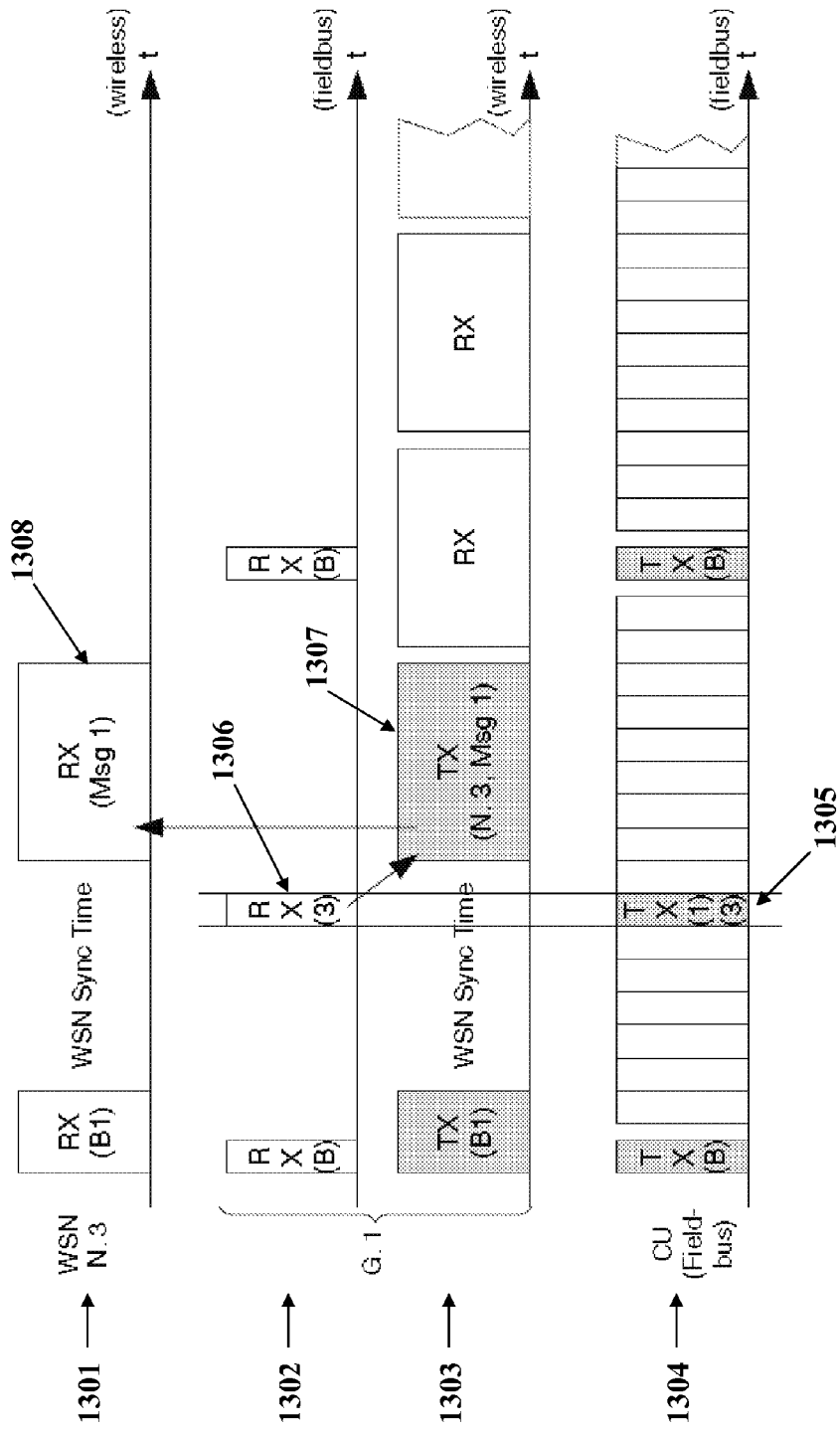

Turning now to FIG. 13, illustrated is a timing diagram of an adaptive hybrid virtual star protocol, illustrating the protocol timing sequence for CU-to-node communication in an exemplary embodiment with reference to the topology and coverage map of FIG. 10. In time sequences 1301, sensor node N. 3 receives (and transmits) messages over the wireless portion of the network. In time sequence 1302 gateway G. 1 receives (and transmits) messages over the wired fieldbus portion of the network, and in time sequence 1303 it transmits and receives messages over the wireless portion of the network. In time sequence 1304 central unit CU transmits (and receives) messages over the wired fieldbus portion of the network.

In a third example a message is transmitted from a central unit to a sensor node. The central unit wants to transmit "Message 1" to the wireless sensor node N. 3 and first checks its stored link quality indication data to find the gateway that had the best (or best average) link quality to N. 3 in prior wireless communication tasks. The central unit selects G. 1 and transmits "Message 1" including the destination gateway and the destination node addresses (as represented in the timeslot 1305) over the wired fieldbus portion of the network, which is received (as represented in the timeslot 1306) by gateway G. 1. The intended recipient of this message is WSN node N.3. The message transmitted by the central unit contains the necessary routing information. Gateway G. 1 transmits (as represented in the timeslot 1307) Message 1 over the wireless portion of the network, which is then received (as represented in the timeslot 1308) by WSN node N. 3.

Figure 14:
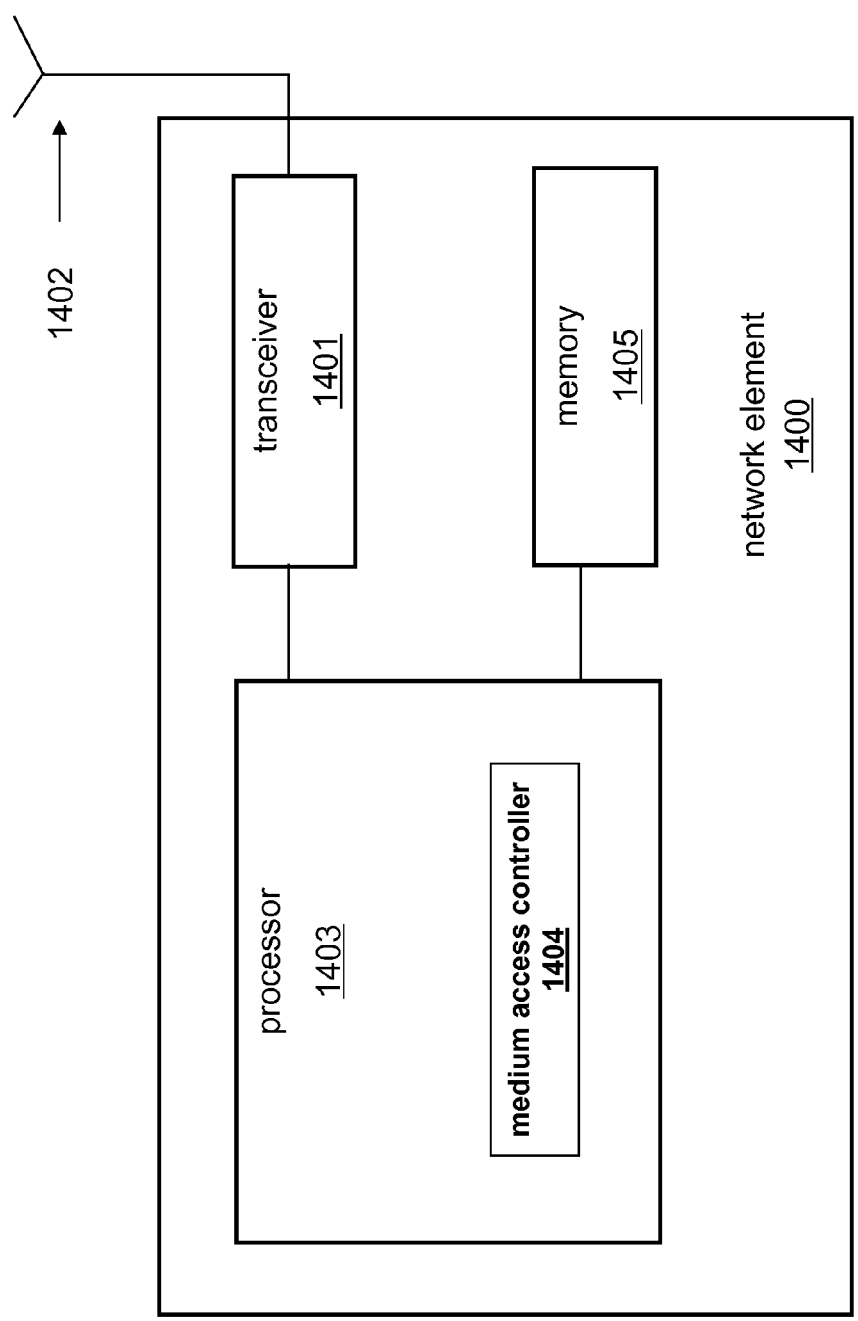
FIG. 14 illustrates a block level diagram of a network element of a wireless sensor network, constructed according to an exemplary embodiment.

Turning now to FIG. 14, illustrated is a block-level diagram illustrating a network element 1400 of a local area network system such as a wireless sensor network system. The network element may represent the communication device of a central unit or a sensor unit. The network element may provide point-to-point and/or point-to-multipoint communication services for a wireless sensor network system.

The network element includes a processor 1403. The processor is coupled to memory 1405 and includes medium access controller 1404. Memory 1405 stores programs and data of a temporary or more permanent nature. The network element further includes an antenna 1402, and a radio frequency transceiver 1401 coupled to the antenna 1402 for bidirectional wireless communications. The network element may provide point-to-point and/or point-to-multipoint communication services.

The processor 1403 in the network element, which may be implemented with one or a plurality of processing devices, performs functions associated with its operation including, without limitation, encoding and decoding of individual bits forming a wireless communication message, formatting of information, and overall control of the network element, including processes related to management of resources. The processor of the network element may be of any type suitable to the local application environment, and may include, without limitation, one or more of microprocessors, digital signal processors, and processors based on a multi-core processor architecture.

The transceiver 1401 of the network element modulates information onto a carrier waveform for transmission by the communication element via the antenna to another network element. The transceiver demodulates information received via the antenna for further processing.

The memory 1405 of the network element may be of any type suitable to the local application environment, and may be implemented using any suitable volatile or nonvolatile data storage technology such as a semiconductor-based memory device as a nonlimiting example. The programs stored in the memory may include program instructions that, when executed by an associated processor, enable the network element to perform tasks as described herein. Exemplary embodiments of a wireless sensor network system and subsystems as described herein may be implemented, at least in part, by computer software executable by processors of the network element.

When serving as a network element such as a central unit, the processor 1403 includes a medium access controller (implemented in software) 1404 configured to allocate transmission resources as described herein. Alternatively, the network element includes the medium access controller implemented as dedicated hardware (or hardware acceleration blocks) in order to improve performance or to reduce power consumption. The transceiver 1401 is configured to transmit and receive messages to and from a sensor node employing resources allocated by the medium access controller.

The concept has thus been introduced of configuring a central unit in a local area sensor network to receive a resource allocation request from a priority network sensor unit in a reserved timeslot, and in response thereto to designate a shared timeslot allocation. In an embodiment, a local area network includes a central unit and a priority network sensor unit. The priority network sensor unit is configured to transmit a resource allocation request in a reserved timeslot, and to receive a reservation bit map from the central unit including an allocation of a shared timeslot in response to the resource allocation request. In response to the received reservation bit map, the priority network sensor unit is configured to transmit data in the allocated shared timeslot. The central unit is configured to receive the resource allocation request from the priority network sensor unit, and to transmit the reservation bit map including the allocation of the shared timeslot in response to the resource allocation request. In an embodiment, the local area network further includes a non-priority network sensor unit, the non-priority network sensor unit configured to receive the reservation bit map, and in response to finding an unallocated shared timeslot therein, to transmit data in the unallocated shared timeslot. In an embodiment, the transmitted data in the unallocated shared timeslot is transmitted using a carrier sense multiple access collision avoidance communication mode. In an embodiment, the central unit is further configured to transmit a beacon to provide synchronization for network sensor units. In a further embodiment, the reservation bit map includes an integrity code. In an embodiment, the central unit transmits an acknowledgment message in response to receiving data from the network sensor unit. In an embodiment, the local area network is a wireless sensor network.

In an embodiment, a sensor network includes a plurality of gateways configured to communicate over wired and wireless networks, and a wireless node configured to communicate with at least one gateway of the plurality of gateways. The sensor network further includes a central unit configured to communicate with the plurality of gateways over a wired network. The central unit is configured to receive a plurality of link quality indicators from the plurality of gateways for respective wireless paths from the wireless node to the plurality of gateways. The central unit is further configured to select a gateway of the plurality of gateways for relaying a message from the central unit to the wireless node. In an embodiment, the central unit is configured to select the gateway of the plurality of gateways for relaying the message based on the plurality of link quality indicators. In an embodiment, the selected gateway relays the message from the central unit using a wireless time division multiple access communication mode. In an embodiment, the central unit establishes network synchronization for the wireless time division multiple access communication mode by broadcasting a beacon over the wired network. In an embodiment, the selected gateway of the plurality of gateways relays the message with a selectively delayed wireless beacon. In an embodiment, the selected gateway of the plurality of gateways transmits the message to the wireless node in a wireless timeslot allocated by the central unit. In an embodiment, each gateway of the plurality of gateways is configured to measure a signal characteristic of a signal received from a wireless node to determine the respective link quality indicator for the respective wireless path. In a further embodiment, the plurality of gateways is configured to forward this indicator to the central unit. In an embodiment, the central unit combines a plurality of messages received by the plurality of gateways from a wireless node to increase reliability of a wireless message from the wireless node.

Another exemplary embodiment provides a method of operating a local area network, preferably a local area sensor network. The method includes transmitting a resource allocation request by a priority network sensor unit in a reserved timeslot in a guaranteed reservation period, and receiving in a central unit the resource allocation request. In an embodiment, the method includes transmitting by the central unit a reservation bit map including an allocation of a shared timeslot in response to the resource allocation request, and receiving the reservation bit map in the priority network sensor unit. In response to receiving the reservation bit map, the priority network sensor transmits data in the allocated shared timeslot. In an embodiment, the method further includes receiving the reservation bit map by a non-priority network sensor unit, and finding an unallocated shared timeslot in the reservation bit map by the non-priority network sensor unit. The method further includes transmitting data in the unallocated shared timeslot by the non-priority network sensor unit. In an embodiment, the method further includes transmitting a synchronization beacon by the central unit. In an embodiment, the method further includes transmitting an acknowledgment message by the central unit in response to receiving data from a network sensor unit. In an embodiment, the local area network is a wireless sensor network.

Another exemplary embodiment provides a method of operating a sensor network. The method includes configuring a plurality of gateways to communicate over wired and wireless portions of the sensor network, and configuring a central unit to communicate with the plurality of gateways over the wired portion of the sensor network. The method further includes receiving a plurality of link quality indicators by the central unit from the plurality of gateways for respective wireless paths from a wireless node to the plurality of gateways, and selecting a gateway of the plurality of gateways by the central unit for relaying a message from the central unit to the wireless node. In an embodiment, the method includes selecting the gateway based on the plurality of link quality indicators. In an embodiment, the method further includes establishing network synchronization for the wireless portion of the sensor network by the central unit by broadcasting a beacon over the wired portion of the network. In an embodiment, the method includes transmitting the message by the selected gateway to the wireless node in a wireless timeslot allocated by the central unit. In an embodiment, the method further includes combining in the central unit a plurality of messages received by the plurality of gateways from the wireless node to increase message reliability.

Although sensor networks and related methods have been described for application to automotive and industrial environments, it should be understood that other applications of medium access control techniques and network structures are contemplated within the broad scope of the invention, and need not be limited to automotive and industrial applications.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A local area network, comprising:
a central transceiver configured to
receive a resource allocation request in a first reserved timeslot in a guaranteed reservation period from a first priority network sensor unit, the first reserved timeslot different from a second reserved timeslot in the guaranteed reservation period assigned to a second priority network sensor unit,
transmit a reservation bit map including an allocation of a first shared timeslot in response to the resource allocation request, and
receive data in the allocated first shared timeslot from the first priority network sensor unit.

2. The local area network as claimed in claim 1, wherein the central transceiver is further configured to receive data from a non-priority network sensor unit in a shared time slot that is indicated by the reservation bit map to be unallocated.

3. The local area network as claimed in claim 2, wherein the central transceiver is configured to receive the data in the shared time slot that is indicated to be unallocated using a carrier sense multiple access collision avoidance communication mode.

4. The local area network as claimed in claim 1, wherein the central transceiver is further configured to transmit a beacon to provide synchronization for network sensor units.

5. The local area network as claimed in claim 1, wherein the reservation bit map includes an integrity code.

6. The local area network as claimed in claim 1, wherein the central transceiver is configured to transmit an acknowledgment message in response to receiving data from a network sensor unit.

7. The local area network as claimed in claim 1, wherein the local area network is a wireless sensor network.

8. The local area network as claimed in claim 1,
wherein the central transceiver is further configured to
communicate with a plurality of gateways over a wired portion of the local area network,
receive a plurality of link quality indicators from the plurality of gateways for respective wireless paths from a wireless node to the plurality of gateways, and
select a gateway of the plurality of gateways for relaying a message from the central transceiver to the wireless node.

9. The local area network as claimed in claim 8, wherein the central transceiver is configured to select the gateway of the plurality of gateways for relaying the message based on the plurality of link quality indicators.

10. The local area network as claimed in claim 8, wherein the central transceiver establishes network synchronization for a wireless time division multiple access communication mode by broadcasting a beacon over the wired portion of the local area network.

11. The local area network as claimed in claim 8, wherein the central transceiver is further configured to allocate a wireless timeslot for the selected gateway of the plurality of gateways to transmit the message to the wireless node.

12. The local area network as claimed in claim 8, wherein the central transceiver is configured to combine a plurality of messages received by the plurality of gateways from a wireless node to increase reliability of a wireless message from the wireless node.

13. The local area network of claim 1, wherein the a central transceiver is further configured to receive a further resource allocation request in the second reserved timeslot in the guaranteed reservation period from the second priority network sensor unit;
transmit the reservation bit map including an allocation of a second shared timeslot in response to the further resource allocation request; and
receive data in the allocated second shared timeslot from the second priority network sensor unit.

14. A method of operating a local area network, the method comprising:
receiving, by a central transceiver, a resource allocation request from a first priority network sensor unit in a first reserved timeslot in a guaranteed reservation period, the first reserved timeslot different from a second reserved timeslot in the guaranteed reservation period assigned to a second priority network sensor unit;
transmitting a reservation bit map including an allocation of a first shared timeslot in response to the resource allocation request; and
receiving data in the allocated first shared timeslot from the first priority network sensor unit.

15. The method as claimed in claim 14, further comprising receiving data from a non-priority network sensor unit in a shared timeslot that is indicated to be unallocated according to the reservation bit map.

16. The method as claimed in claim 14, further comprising transmitting a synchronization beacon by the central transceiver.

17. The method as claimed in claim 14, further comprising transmitting an acknowledgment message by the central transceiver in response to receiving data from a network sensor unit.

18. The method as claimed in claim 14, wherein the local area network is a wireless sensor network.

19. The method as claimed in claim 14, further comprising:
configuring the central transceiver to communicate communication with a plurality of gateways over a wired portion of the sensor network, wherein the gateways are configured to communicate over wired and wireless portions of the local area network;
receiving, by the central transceiver, a plurality of link quality indicators from the plurality of gateways for respective wireless paths from a wireless node to the plurality of gateways; and
selecting a gateway of the plurality of gateways by the central transceiver for relaying a message from the central transceiver to the wireless node.

20. The method as claimed in claim 19, wherein the selected gateway is selected based on the plurality of link quality indicators.

21. The method as claimed in claim 19, further comprising establishing, by the central transceiver, network synchronization for the wireless portion of the sensor network by broadcasting a beacon over the wired portion of the network.

22. The method as claimed in claim 19, further comprising combining, in the central transceiver, a plurality of messages received by the plurality of gateways from the wireless node to increase message reliability.

23. A communication unit for a sensor network, the communication unit comprising:
a processor; and
a wireless transceiver coupled to the processor, the communication unit configured to
receive a resource allocation request in a first reserved timeslot in a guaranteed reservation period from a first priority network sensor unit, the first reserved timeslot different from a second reserved timeslot in the guaranteed reservation period assigned to a second priority network sensor unit,
transmit a reservation bit map including an allocation of a first shared timeslot in response to the resource allocation request, and
receive data in the allocated first shared timeslot from the first priority network sensor unit.

24. The communication unit of claim 23, further comprising a wire line transceiver configured to communication with a central unit over a wired portion of the sensor network.

* * * * *